(12) United States Patent
Bakker et al.

(10) Patent No.: US 8,463,913 B2
(45) Date of Patent: Jun. 11, 2013

(54) SYSTEM AND METHOD OF RESPONDING TO A REQUEST IN A NETWORK ENVIRONMENT INCLUDING IMS

(75) Inventors: Jan John-Luc Bakker, Keller, TX (US); Andrew Allen, Mundelein, IL (US); Adrian Buckley, Tracy, CA (US)

(73) Assignee: Research In Motion Limited, Waterloo (CA)

(*) Notice: Subject to any disclaimer, the term of this patent is extended or adjusted under 35 U.S.C. 154(b) by 135 days.

(21) Appl. No.: 12/240,381

(22) Filed: Sep. 29, 2008

(65) Prior Publication Data
US 2009/0119381 A1 May 7, 2009

Related U.S. Application Data

(60) Provisional application No. 60/976,419, filed on Sep. 29, 2007, provisional application No. 60/978,976, filed on Oct. 10, 2007.

(51) Int. Cl.
*G06F 15/16* (2006.01)

(52) U.S. Cl.
USPC ........... 709/227; 709/203; 709/206; 709/207; 709/230

(58) Field of Classification Search
USPC .......... 709/201, 204, 230, 246, 203, 206, 709/207, 227
See application file for complete search history.

(56) References Cited

U.S. PATENT DOCUMENTS

| | | | |
|---|---|---|---|
| 5,710,908 A | 1/1998 | Man | |
| 6,690,783 B2 | 2/2004 | Creamer et al. | |
| 6,789,126 B1 * | 9/2004 | Saulpaugh et al. | 709/245 |
| 6,792,466 B1 * | 9/2004 | Saulpaugh et al. | 709/229 |
| 6,944,762 B1 * | 9/2005 | Garrison | 713/160 |
| 6,950,875 B1 * | 9/2005 | Slaughter et al. | 709/230 |
| 6,970,935 B1 | 11/2005 | Maes | |
| 7,010,727 B1 * | 3/2006 | Stucker | 714/52 |
| 7,076,568 B2 | 7/2006 | Philbrick et al. | |
| 7,149,299 B2 * | 12/2006 | Triano et al. | 379/210.01 |
| 7,177,859 B2 * | 2/2007 | Pather et al. | 1/1 |
| 7,194,516 B2 * | 3/2007 | Giacobbe et al. | 709/206 |

(Continued)

FOREIGN PATENT DOCUMENTS

| | | |
|---|---|---|
| EP | 2458815 | 5/2012 |
| WO | 02054673 A1 | 7/2002 |
| WO | 2003/094563 | 3/2003 |

OTHER PUBLICATIONS

PCT Notification of Transmittal of the International Search Report and the Written Opinion of the International Searching Authority; Application No. PCT/US2008/078138; Jan. 5, 2009; 12 pages.

(Continued)

*Primary Examiner* — Michael Won
(74) *Attorney, Agent, or Firm* — The Danamraj Law Group, P.C.

(57) ABSTRACT

In one embodiment, a scheme is disclosed for facilitating responding to a request in a network environment including IMS. A component associated with a recipient is configured to receive an incoming message from a sender, wherein the incoming message is substantially free of an indication of acceptance by the sender of a body of a particular content type. A component associated with the recipient is configured to provide an outgoing message including at least one body of the particular content type.

24 Claims, 14 Drawing Sheets

U.S. PATENT DOCUMENTS

| | | | |
|---|---|---|---|
| 7,218,626 B2 | 5/2007 | Shaheen et al. | |
| 7,240,285 B2 * | 7/2007 | Rising et al. | 715/240 |
| 7,245,900 B1 * | 7/2007 | Lamb et al. | 455/404.1 |
| 7,290,012 B2 | 10/2007 | Charlet et al. | |
| 7,366,722 B2 | 4/2008 | Doddington | |
| 7,397,775 B2 * | 7/2008 | Womack et al. | 370/328 |
| 7,441,032 B2 * | 10/2008 | Costa Requena | 709/225 |
| 7,480,915 B2 * | 1/2009 | Costa Requena et al. | 719/311 |
| 7,483,384 B2 | 1/2009 | Bryant et al. | |
| 7,539,759 B2 | 5/2009 | Narayanan et al. | |
| 7,548,948 B2 | 6/2009 | Klemets et al. | |
| 7,552,225 B2 * | 6/2009 | Creamer et al. | 709/230 |
| 7,596,102 B2 | 9/2009 | Forbes et al. | |
| 7,602,723 B2 * | 10/2009 | Mandato et al. | 370/236 |
| 7,664,883 B2 | 2/2010 | Craft et al. | |
| 7,668,159 B2 * | 2/2010 | Buckley et al. | 370/354 |
| 7,710,950 B2 * | 5/2010 | Buckley et al. | 370/354 |
| 7,774,011 B2 | 8/2010 | Sung et al. | |
| 7,796,603 B1 * | 9/2010 | Bertone et al. | 370/395.2 |
| 7,844,270 B2 * | 11/2010 | Sylvain | 455/436 |
| 8,000,732 B2 * | 8/2011 | Albertsson et al. | 455/518 |
| 8,051,287 B2 | 11/2011 | Shetty et al. | |
| 8,155,077 B2 | 4/2012 | Grayson | |
| 8,266,203 B2 | 9/2012 | Xu et al. | |
| 8,266,297 B2 * | 9/2012 | Li et al. | 709/227 |
| 2002/0097852 A1 | 7/2002 | Huyghe et al. | |
| 2002/0111840 A1 | 8/2002 | Bagdonas | |
| 2002/0111989 A1 | 8/2002 | Ambler et al. | |
| 2002/0126701 A1 | 9/2002 | Requena | |
| 2003/0033334 A1 * | 2/2003 | Banerjee et al. | 707/542 |
| 2003/0188010 A1 | 10/2003 | Raza et al. | |
| 2004/0087299 A1 | 5/2004 | Vallinen et al. | |
| 2004/0103157 A1 | 5/2004 | Requena et al. | |
| 2004/0196867 A1 * | 10/2004 | Ejzak et al. | 370/468 |
| 2004/0199638 A1 * | 10/2004 | Kaler | 709/227 |
| 2004/0203680 A1 * | 10/2004 | Sylvain | 455/417 |
| 2005/0066038 A1 * | 3/2005 | Sakamoto et al. | 709/227 |
| 2005/0108332 A1 * | 5/2005 | Vaschillo et al. | 709/206 |
| 2005/0207415 A1 * | 9/2005 | Curcio et al. | 370/390 |
| 2006/0045067 A1 | 3/2006 | Dezonno et al. | |
| 2006/0075042 A1 * | 4/2006 | Wang et al. | 709/206 |
| 2006/0174009 A1 * | 8/2006 | Martiquet et al. | 709/227 |
| 2006/0223510 A1 | 10/2006 | Takeda et al. | |
| 2006/0229093 A1 * | 10/2006 | Bhutiani et al. | 455/518 |
| 2006/0229095 A1 * | 10/2006 | Sung et al. | 455/518 |
| 2006/0294243 A1 * | 12/2006 | Kuure et al. | 709/227 |
| 2007/0043872 A1 * | 2/2007 | Pattan et al. | 709/227 |
| 2007/0078986 A1 | 4/2007 | Ethier et al. | |
| 2007/0094691 A1 | 4/2007 | Gazdzinski | |
| 2007/0100981 A1 * | 5/2007 | Adamczyk et al. | 709/223 |
| 2007/0239737 A1 | 10/2007 | Dudley et al. | |
| 2007/0259651 A1 | 11/2007 | Bae et al. | |
| 2007/0280447 A1 | 12/2007 | Cia et al. | |
| 2008/0002662 A1 | 1/2008 | Grayson et al. | |
| 2008/0043726 A1 | 2/2008 | Herrero-Vernon et al. | |
| 2008/0056151 A1 * | 3/2008 | Gazier et al. | 370/252 |
| 2008/0086525 A1 | 4/2008 | Angwin | |
| 2008/0115125 A1 * | 5/2008 | Stafford et al. | 718/1 |
| 2008/0123686 A1 | 5/2008 | Lee et al. | |
| 2008/0155024 A1 | 6/2008 | Morris | |
| 2008/0162637 A1 * | 7/2008 | Adamczyk et al. | 709/204 |
| 2008/0240400 A1 * | 10/2008 | Mairs et al. | 379/221.02 |
| 2008/0261557 A1 | 10/2008 | Sim | |
| 2008/0268824 A1 | 10/2008 | Allen et al. | |
| 2008/0320083 A1 * | 12/2008 | Albertsson et al. | 709/205 |
| 2009/0011780 A1 | 1/2009 | Salinas et al. | |
| 2009/0047922 A1 * | 2/2009 | Buckley et al. | 455/404.1 |
| 2009/0049087 A1 | 2/2009 | Cackowski et al. | |
| 2009/0067417 A1 | 3/2009 | Kalavade et al. | |
| 2009/0070469 A1 * | 3/2009 | Roach et al. | 709/226 |
| 2009/0093250 A1 | 4/2009 | Jackson et al. | |
| 2009/0116467 A1 * | 5/2009 | Shi et al. | 370/338 |
| 2009/0119281 A1 | 5/2009 | Wang et al. | |
| 2009/0119316 A1 | 5/2009 | Bakker | |
| 2009/0119380 A1 | 5/2009 | Bakker | |
| 2009/0119382 A1 | 5/2009 | Bakker | |
| 2009/0119389 A1 * | 5/2009 | Mu et al. | 709/219 |
| 2009/0129396 A1 | 5/2009 | Bakker | |
| 2009/0190577 A1 | 7/2009 | Allen et al. | |
| 2009/0238168 A1 * | 9/2009 | Lavoie et al. | 370/352 |
| 2009/0280770 A1 * | 11/2009 | Mahendran | 455/404.1 |
| 2009/0316690 A1 | 12/2009 | Kim et al. | |
| 2009/0323636 A1 * | 12/2009 | Dillon et al. | 370/331 |
| 2010/0238839 A1 * | 9/2010 | Batteram et al. | 370/254 |
| 2010/0293253 A1 | 11/2010 | Kaida | |

OTHER PUBLICATIONS

PCT Notification of Transmittal of the International Search Report and the Written Opinion of the International Searching Authority; Application No. PCT/US2008/078146; Jan. 12, 2009; 12 pages.

PCT Notification of Transmittal of the International Search Report and the Written Opinion of the International Searching Authority; Application No. PCT/US2008/078151; Jan. 5, 2009; 13 pages.

Berners-Lee et al.; "Hypertext Transfer Protocol—HTTP/1.0"; HTTP Working Group; Mar. 8, 1995; 57 pages.

Vaudreuil et al.; "VPIM Voice Message MIME Sub-type Registration"; Network Working Group; Sep. 1998; 7 pages.

Zimmerer et al.; "MIME media types for ISUP and QSIG Objects"; Network Working Group; Dec. 2001; 11 pages.

Rosenberg; "A Session Initiation Protocol (SIP) Event Package for Registrations"; Network Working Group; Mar. 2004; 26 pages.

Hilt et al.; "Media Type Extension Negotiation in the Session Initiation Protocol (SIP) Accept Header Field draft-hilt-sip-ext-neg-00"; Session Initiation Protocol Working Group; Jan. 19, 2005; 8 pages.

Rosenberg et al.; "An INVITE-Initiated Dialog Event Package for the Session Initiation Protocol (SIP)"; Network Working Group; Nov. 2005; 39 pages.

Rosenberg et al.; "A Session Initiation Protocol (SIP) Event Package for Conference State"; Network Working Group; Aug. 2006; 48 pages.

PCT International Search Report and Written Opinion in Application No. PCT/US2008/080769; International Searching Authority; Mar. 2, 2009; 13 pages.

Change Request; 24.229 CR 2168; Rev 6; Version 8.3.0; Apr. 7-11, 2008; 10 pages.

Rosenberg et al; "SIP: Session Initiation Protocol"; XP-002323877; Jun. 2002; 269 pages.

"Telecommunications and Internet Converged Services and Protocols for Advanced Networking (TISPAN); IP Multimedia Call Control Protocol based on Session Initiation Protocol (SIP) and Session Description Protocol (SDP) Stage 3"; ETSI ES 283 003 V1.7.0; May 2007; 96 pages.

PCT International Search Report and Written Opinion in Application No. PCT/US2008/083937; International Searching Authority; Apr. 24, 2009; 15 pages.

"Telecommunications and Internet Converged Services and Protocols for Advanced Networking (TISPAN); SIP Transfer of Charging Information"; Draft TS 183 058 V0.0.6; Sep. 2007; 46 pages.

Change Request; 24.229 CR 2136; Rev 1; Version 8.1.0; Nov. 5-9, 2007; 13 pages.

USPTO, Office Action, U.S. Appl. No. 12/240,286, Mar. 10, 2011, 12 pgs.

USPTO, Office Action, U.S. Appl. No. 12/240,321, Jun. 13, 2011, 12 pgs.

EP Communication Examination Report, Application No. 08 834 784.4, European Patent Office, Sep. 27, 2010, 5 pgs.

EP Communication Examination Report, Application No. 08 835 366.9, European Patent Office, Sep. 27, 2010, 5 pgs.

EP Communication Examination Report, Application No. 08 836 093.8, European Patent Office, Sep. 27, 2010, 5 pgs.

Gonzalez, Jeff, "15 Seconds: Building an XML and XSD Schema Validation Tool," Jupitermedia Corp, Oct. 22, 2002, 6 pgs.

US Office Action, U.S. Appl. No. 12,240,286, USPTO, May 4, 2010, 10 pgs.

US Office Action, U.S. Appl. No. 12/240,286, USPTO, Nov. 18, 2010, 10 pgs.

US Office Action, U.S. Appl. No. 12/256,169, USPTO, Nov. 20, 2009, 32 pgs.

US Office Action, U.S. Appl. No. 12/256,169, USPTO, May 18, 2010, 36 pgs.

US Office Action, U.S. Appl. No. 12/273,465, USPTO, Oct. 18, 2010, 12 pgs.
EPO, Communication Pursuant to Article 94(3) EPC, Application No. 08836093.8, Aug. 9, 2011, 5 pgs.
EPO, Communication Under Rule 71(3) EPC, Application No. 08834784.4, Aug. 23, 2011, 6 pgs.
EPO, Communication Pursuant to Article 94(3) EPC, Application No. 08835366.9, Aug. 9, 2011, 4 pgs.
USPTO, Office Action, U.S. Appl. No. 12/240,286, Sep. 8, 2011, 11 pgs.
EPO, Communication Pursuant to Article 94(3) EPC, Application No. 08835366.9, May 7, 2012, 5 pgs.
EPO, Extended Search Report, Application No. 12150976.4, Apr. 26, 2012, 4 pgs.
USPTO, Office Action, U.S. Appl. No. 12/240,286, Apr. 18, 2012, 12 pgs.
USPTO, Office Action, U.S. Appl. No. 12/240,286, Dec. 30, 2011, 12 pgs.
USPTO, Office Action, U.S. Appl. No. 12/240,321, Dec. 9, 2011, 11 pgs.
USPTO, Office Action, U.S. Appl. No. 12/240,286, Oct. 2, 2012, 15 pgs.
USPTO, Office Action, U.S. Appl. No. 12/256,169, Aug. 30, 2012, 29 pgs.
CIPO, Office Action, Application No. 2,701,121, Aug. 8, 2012, 3 pgs.
CIPO, Office Action, Application No. 2,701,122, Aug. 8, 2012, 3 pgs.
CIPO, Office Action, Application No. 2,701,123, Aug. 7, 2012, 3 pgs.
SIPO, Office Action, Application No. 200880122526.X, Jul. 9, 2012, 3 pgs.
USPTO, Pre-Appeal Brief Decision, U.S. Appl. No. 12/240,286, Aug. 1, 2012, 2 pgs.
USPTO, Office Action, U.S. Appl. No. 12/240,286, Aug. 8, 2012, 13 pgs.
USPTO, Notice of Allowance, U.S. Appl. No. 12/256,169, Nov. 19, 2012, 21 pgs.
PCT International Preliminary Report of Patentability; App No. PCT/US2008/078138; dated Jan. 19, 2010; 11 pgs.
PCT International Preliminary Report of Patentability; App No. PCT/US2008/078146; dated Jan. 19, 2010; 6 pgs.
PCT International Preliminary Report of Patentability; App No. PCT/2008/080769; dated Jul. 10, 2009; 12 pgs.
PCT International Preliminary Report of Patentability; App No. PCT/US2008/083937; dated Jun. 3, 2010; 12 pgs.
PCT International Preliminary Report of Patentability; App No. PCT/US2008/078151; dated Jan. 19, 2010; 5 pgs.
USPTO, Office Action, U.S. Appl. No. 12/240,286, Jan. 28, 2013, 13 pgs.
USPTO, Office Action, U.S. Appl. No. 12/240,286, Mar. 4, 2013, 13 pgs.
EPO, Communication Pursuant to Article 94(3) EPC, Application No. 08835366.9, Jan. 30, 2013, 5 pgs.
SIPO, Second Office Action, Application No. 200880122526, Mar. 14, 2013, 3 pgs.

* cited by examiner

SYSTEM AND METHOD OF RESPONDING TO A REQUEST IN A NETWORK ENVIRONMENT INCLUDING IMS

PRIORITY UNDER 35 U.S.C. §119(e) & 37 C.F.R. §1.78

This nonprovisional patent application claims priority based upon the following prior U.S. provisional patent application(s): (i) "SYSTEM AND METHODS FOR HANDLING VERSIONED SIP XML BODIES," Application No. 60/976,419, filed Sep. 29, 2007, in the name(s) of Jan John-Luc Bakker, Andrew Allen and Adrian Buckley; and (ii) "SYSTEM AND METHODS FOR HANDLING VERSIONED SIP XML BODIES INCLUDING MIME TYPES," Application No. 60/978,976, filed Oct. 10, 2007, in the name (s) of Jan John-Luc Bakker, Andrew Allen and Adrian Buckley; each of which is hereby incorporated by reference.

REFERENCE TO RELATED APPLICATION(S)

This application discloses subject matter that is related to the subject matter of the following U.S. patent application(s): (i) "SCHEMA NEGOTIATION FOR VERSIONED DOCUMENTS TRANSMITTED IN A DISTRIBUTED ENVIRONMENT", application Ser. No. 12/240,286, filed Sep. 29, 2008, in the name(s) of Jan John-Luc Bakker, Andrew Allen and Adrian Buckley; and (ii) "SCHEMA INDICATION SYSTEM AND METHOD IN A NETWORK ENVIRONMENT INCLUDING IMS", application Ser. No. 12/240,321, filed Sep. 29, 2008, in the name(s) of Jan John-Luc Bakker, Andrew Allen and Adrian Buckley; each of which is hereby incorporated by reference.

FIELD OF THE DISCLOSURE

The present patent disclosure generally relates to message processing in communications networks. More particularly, and not by way of any limitation, the present patent disclosure is directed to a system and method for responding to request messages in a network environment including an Internet Protocol (IP) Multimedia Subsystem (IMS) network.

BACKGROUND

Markup languages are being used in describing information relating to messages implemented in communication protocols. In a network environment where different entities communicate with each other using message bodies in Markup languages that are extensible, it becomes important that the languages as well as any meta-structures used for understanding the language are compatible across the environment. Otherwise, significant interoperability issues leading to failure in communication, unpredictable behavior, etc., for example, may arise.

BRIEF DESCRIPTION OF THE DRAWINGS

A more complete understanding of the embodiments of the present patent disclosure may be had by reference to the following Detailed Description when taken in conjunction with the accompanying drawings wherein.

DETAILED DESCRIPTION OF THE DRAWINGS

Figure 1:
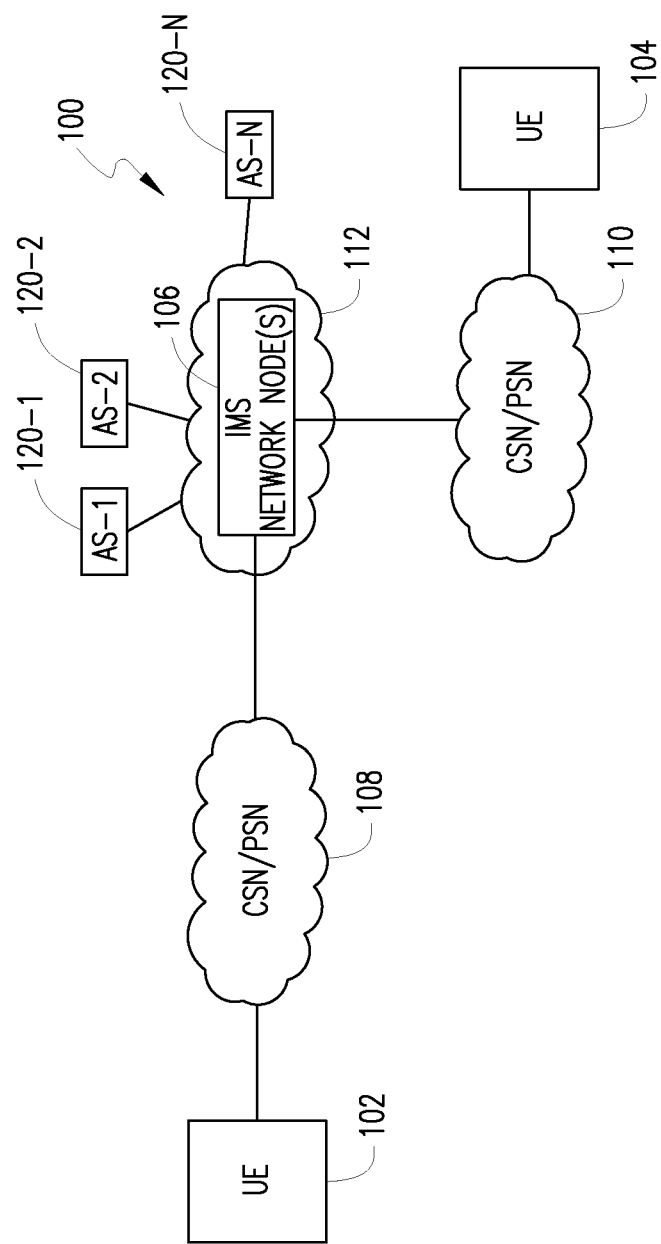
FIG. 1 depicts an exemplary distributed network environment wherein one or more embodiments of the present patent disclosure may be practiced.

The present patent disclosure is broadly directed to a system and method for facilitating responding to request messages in a network environment. In the context of the present patent application, a "message" or "message body" may refer to one or more message bodies, which in turn can be equivalent to one or more body parts, and vice versa. Additionally, the expression "schema information" may include schema version, document instance version, scoping of extensions, or any combination thereof, relating to on or more message body/bodies (or body part(s)) of a communication protocol message. In one aspect, an embodiment is directed to a method of responding to a request in a network environment. The claimed embodiment comprises one or more of the following and is not necessarily limited to: receiving at a recipient an incoming message from a sender, the incoming message being substantially free of an indication of acceptance by the sender of a body of a particular content type; and providing an outgoing message including at least one body of the particular content type. In another embodiment, a method of responding to a request in a network environment is disclosed, wherein the method comprises one or more of the following and is not necessarily limited to: receiving at a recipient an incoming message from a sender, the incoming message being substantially free of a schema indicator to indicate acceptability of a particular variation of content type of a message body; and providing an outgoing message including at least one body of the particular variation of content type.

In another embodiment of the present patent disclosure, an apparatus for facilitating responding to a request in a network environment. The claimed apparatus comprises one or more of the following and is not necessarily limited to: a component associated with a recipient configured to receive an incoming message from a sender, the incoming message being substantially free of an indication of acceptance by the sender of a body of a particular content type; and a component associated with the recipient configured to provide an outgoing message including at least one body of the particular content type.

In certain other aspects, the present disclosure is also related to a scheme for effectuating an ES call in a network environment including an IMS network. One of the embodiments relating this aspect comprises one or more of the following and is not necessarily limited to: receiving a service request from a UE device disposed in the network environment for setting up an ES call over the IMS network; and generating a response message towards the UE device, the response message including an indication that the ES call is to be set up over an alternative network. In another embodiment, disclosed herein is a UE device operable for effectuating an ES call in a network environment including an IMS network. The claimed UE device comprises one or more of the following and is not necessarily limited to: a component configured to generate a service request towards a network node disposed in the network environment for setting up an ES call over the IMS network; and a component configured to process a response message received from the network node, the response message including an indication that the ES call is to be set up over an alternative network. In a still further embodiment, a network node is disclosed for effectuating an ES call in a network environment including an IMS network. The claimed network node comprises one or more of the following and is not necessarily limited to: a component configured to process a service request received from a UE device disposed in the network environment for setting up an ES call over the IMS network; and a component configured to generate a response message towards the UE device, the response message including an indication that the ES call is to be set up over an alternative network.

The term "document" in the present patent disclosure can mean one of the following depending on its context: a document can be the body of a SIP message (which can be a request or a response), or it can be a body part of a SIP message (request or response) (in the event the body contains multiple parts), or it can be an XML schema document, or it can be a XML instance document (typically an instance of one or more XML schema document (s)). The term "schema version indicator" can indicate the following: (i) none or one or more sets of documents supported by a recipient or none or one or more sets of documents within which the transmitted document is an element; or (ii) none or one or more schemas supported by a recipient or none or one or more schemas by which the transmitted document can be validated; or (iii) a combination of the above.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, an exemplary distributed environment 100 is depicted wherein one or more embodiments of the present patent disclosure may be practiced for managing schema version negotiation with respect to message bodies. At the outset, it should be realized that although the distributed environment 100 is exemplified as a telecommunications network, the embodiments of the present disclosure are not necessarily limited thereto and one or more aspects of the embodiments may be practiced in other distributed multi-node environments wherein entities or nodes communicate with one another in suitable communication protocols having versioned message bodies and message body types.

As depicted, the network environment 100 includes multiple entities or nodes, i.e., endpoints as well as entities intermediate therebetween, for purposes of effectuating various telecommunications services. Exemplary endpoints comprise User Equipment (UE) devices 102, 104 that are coupled to a core network infrastructure 112 by means of suitable access networks 108, 110, respectively. Access networks 108, 110 may collectively be deemed as an access space comprised of a number of access technologies available to UE devices 102, 104. For purposes of the present disclosure, a UE device may be any tethered or untethered communications device, and may include any personal computer (e.g., desktops, laptops, palmtops, or handheld computing devices) equipped with a suitable wireless modem or a mobile communications device (e.g., cellular phones or data-enabled handheld devices capable of receiving and sending messages, web browsing, et cetera), or any enhanced PDA device or integrated information appliance capable of email, video mail, Internet access, corporate data access, messaging, calendaring and scheduling, information management, and the like. In one embodiment, a UE device may be capable of operating in multiple modes in that it can engage in both Circuit-Switched (CS) as well as Packet-Switched (PS) communications, and can transition from one mode of communications to another mode of communications without loss of continuity. Furthermore, those skilled in the art will recognize that a wireless UE device may sometimes be treated as a combination of a separate mobile equipment (ME) device and an associated removable memory module. Accordingly, for purposes of the present disclosure, the terms "wireless device" and "UE device", which are broadly synonymous, are each treated as representative of both ME devices alone as well as the combinations of ME devices with removable memory modules as applicable.

The access space comprising the access networks 108, 110 may include CS networks, PS networks, or both, which may involve wireless technologies, wireline technologies, broadband access technologies, etc. For example, wireless technologies may include Global System for Mobile Communications (GSM) networks and Code Division Multiple Access (CDMA) networks, as well as any $3^{rd}$ Generation Partnership Project (3GPP)-compliant cellular network (e.g., 3GPP or 3GPP2). Broadband access networks may include wireless local area networks or WLANs, Wi-MAX networks as well as fixed networks such as Digital Subscriber Line (DSL), cable broadband, etc. Thus, for purposes of the present disclosure, the access technologies may comprise radio access technologies selected from IEEE 802.11a technology, IEEE 802.11b technology, IEEE 802.11g technology, IEEE 802.11n technology, GSM/EDGE Radio Access Network (GERAN) technology (both CS and PS domains), and Universal Mobile Telecommunications System (UMTS) technology, and Evolution-Data Optimized (EVDO) technology, and their successors such as Long Term Evolution (LTE), and so on. Additionally, the access networks 108, 110 may also include the conventional wireline PSTN infrastructure in some implementations.

The network infrastructure 112 may comprise an IP Multimedia Subsystem (IMS) core layer as well as a services/applications layer. As is well known, the IMS core is defined by the standards set forth by the 3GPP body that are designed to allow service providers manage a variety of services to be delivered via IP over any network type, wherein IP is used to transport both bearer traffic and Session Initiation Protocol (SIP)-based signaling traffic. Broadly, IMS is a framework for managing the applications (i.e., services) and networks (i.e., access) that is capable of providing multimedia services. IMS defines an "application server" as a network element that delivers services subscribers use, e.g., voice call continuity (VCC), Push-To-Talk (PTT), PTT-over-Cellular (PoC), or other IMS Centralized Services (ICS) service, etc. IMS manages applications by defining common control components that each application server (AS), e.g., AS-1 120-1 through AS-N 120-N, is required to have, e.g., subscriber profiles, IMS mobility, network access, authentication, service authorization, charging and billing, inter-operator functions, and interoperation with the legacy phone network.

It should be understood that whereas IMS is defined by the 3GPP standards body that mainly addresses GSM networks, another group, 3GPP2, is involved in defining a closely analogous architecture referred to as Multimedia Domain (MMD). MMD is basically an IMS for CDMA networks, and since MMD and IMS are roughly equivalent, the term "IMS" may be used in this present patent disclosure to refer collectively to both IMS and MMD where applicable. In addition, fixed network standards for NGN (Next Generation Networks) that are based on and/or reuse IMS are also being developed by bodies such as ETSI TISPAN, Cablelabs and the ITU-T. NGN and IMS are roughly equivalent, and accordingly the term "IMS" may also be used in this present patent disclosure to refer collectively to both IMS and NGN where applicable.

Continuing to refer to FIG. 1, reference numeral 106 refers to one or more network nodes that comprise the core infrastructure. By way of illustration, network node 106 may exemplify Proxy-Call Session Control Function (P-CSCF) nodes, Serving-CSCF or S-CSCF nodes, Interrogating-CSCF or I-CSCF nodes, Breakout Gateway Control Function (BGCF) nodes, Interconnection Border Control Function (IBCF) nodes, Media Gateway Control Function (MGCF) nodes, Home Subscriber Server (HSS) nodes, and the like. As alluded to previously, these nodes as well as the endpoint UE devices employ SIP as a communication protocol for session control, i.e., setting up and tearing down communication sessions. Accordingly, the network nodes and the UE devices may collectively be referred to as "SIP entities", or more generally, "communication protocol entities", that engage in sending and receiving suitable communication protocol messages (e.g., SIP messages) for effectuating various services, e.g., VCC, PTT, PoC, Emergency Services, etc.

Each SIP entity is typically provided with a User Agent (UA) that may operate in two fashions: (i) User Agent Client (UAC) that generates request messages towards servers; and (ii) User Agent Server (UAS) that receives request messages, processes them and generates suitable responses. In some application scenarios, a single UA may function as both at a SIP entity, e.g., a UE device or a network node. In the most basic form, SIP uses six types (methods) of requests:

INVITE: Indicates a user or service is being invited to participate in a call session.
ACK: Confirms that the client has received a final response to an INVITE request.
BYE: Terminates a call/session and can be sent by either the caller or the callee.
CANCEL: Cancels any pending searches but does not terminate a call/session that currently in progress.
OPTIONS: Queries the capabilities of servers.
REGISTER: Registers the address listed in the To: header field with a SIP server.

Figure 5A:
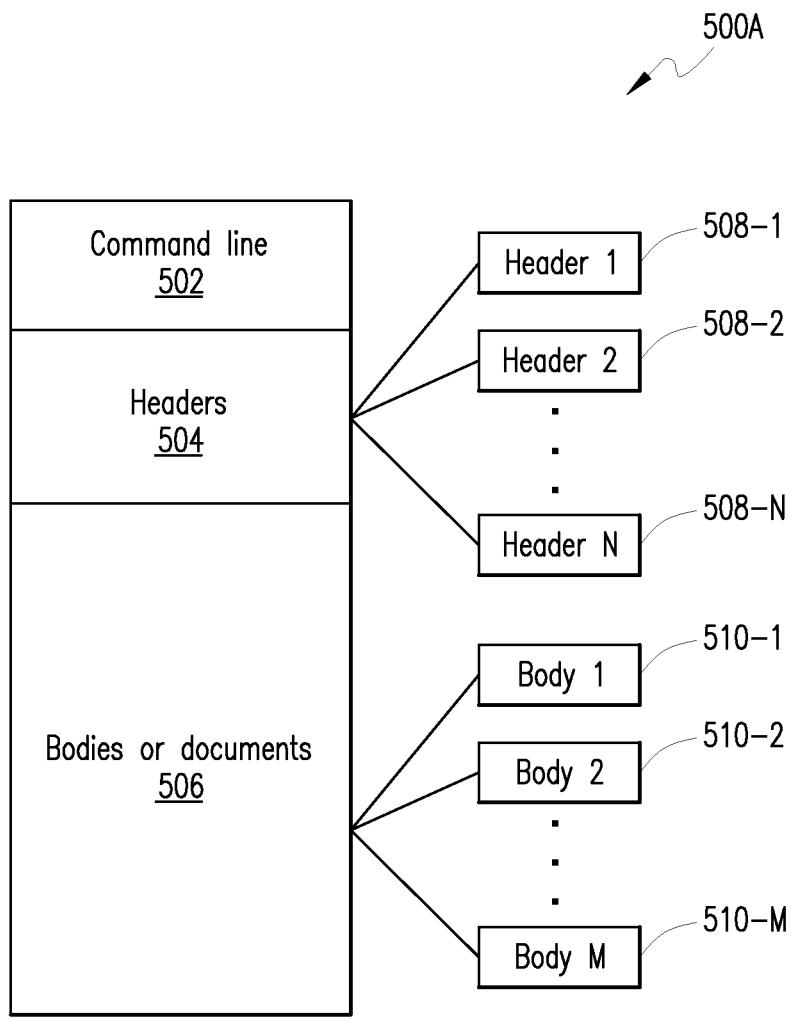
FIG. 5A depicts the structure of an exemplary communication protocol message (e.g., a Session Initiation Protocol (SIP) message) having one initial line, one or more header fields, and a message body, where the message body possibly includes multiple body parts.

As SIP can continue to evolve, a recipient may receive a method of request that it does not recognize. Such a method of request is handled as the UNKNOWN method of request. In response to requests, SIP uses the following categories of responses:

1xx Informational Messages
2xx Successful Responses
3xx Redirection Responses
4xx Request Failure Responses
5xx Server Failure Responses
6xx General Failure Responses SIP messages are typically provided with a standardized message structure. FIG. 5A depicts the structure of an exemplary communication protocol message (e.g., a Session Initiation Protocol (SIP) message) having one initial line, one or more header fields, and a message body, where the message body possibly includes multiple body parts. A command line portion 502 identifies the initial line (e.g., a request line in requests and a status line in responses). A header portion 504 identifies one or more header fields 508-1 through 508-N that convey various pieces of information. One or more message bodies 510-1 through 510-M may be provided in a message body portion 506. As is well known, a message body is operable to hold any content such as plain text, coded images, or any information that may be rendered, e.g., in a Markup Language such as XML, HTML, etc. Each message body (or body part) is described using header fields such as, but not limited to, Content-Disposition, Content-Encoding, and Content-Type, etc., which provide information on its contents. Typically, the value of a Content-Type header field is a Multipurpose Internet Mail Extensions (MIME) type. Furthermore, where a Markup Language is used for describing the message contents, such a message body may also be referred to as a document. Such a document conforms to a schema document. Each schema can produce one or more document instances or documents or instances. Due to the extensibility of the Markup Language, if the schema document evolves, it is possible that the schema can produce additional or even a different set of document instances. The sets with instance documents produced by the various (evolved) schema documents can be identified with tokens. In one embodiment, the set with instance documents may be identified with the same token as the token identifying the evolved schema document. In another embodiment, this token can be a digit, a decimal, a URN namespace, or a string of characters. In yet another embodiment, the set with schema documents may be identified with a token. In a still further embodiment, the set with instance documents may be identified with a token.

SIP-based applications, including the session control applications for communications services implemented in a communications network such as the network 100 shown in FIG. 1, increasingly rely on XML documents to exchange data and/or other information. In general, various SIP entities may communicate with each other using XML documents as a common data interchange language for effectuating communication sessions, Business-to-Business (B2B) and Business-to-Consumer (B2C) applications, etc. Additionally, technologies such as web servers, servlets, web applications, web services, and the like also generally rely in some fashion on data organized according to the XML Specification.

XML is a subset of a family of Standardized General Markup Languages (SGML) and is standardized by the W3 Consortium. As such, XML is a hierarchical set of entities wherein an entity may contain one or more elements. Each element comprises an opening label or tag, text, and a closing label or tag. Typically, elements also contain one or more attributes that operate to modify information contained in the elements. As a descriptive language to describe information or data passed between nodes, XML is provided with certain syntax rules such as, e.g., (i) XML documents must have a root element; (ii) XML elements must have a closing tag; (iii) XML tags are case sensitive; (iv) XML elements must be properly nested and/or ordered; (v) XML attribute values must be quoted, and so on. An XML file with correct syntax is called a "well formed" XML file. Because of extensibility (which allows any author to define their own application-specific elements, attributes, etc.), an XML document may exist in multiple variations, yet a recipient may still only be configured to use a subset of elements and attributes present in the various possible variations. To facilitate document compatibility between multiple nodes, certain meta-level structure or "schema" that is relevant to a particular document type is implemented at the transacting nodes. The various meta-level structures or "schemas" defining the sets of possible XML instance documents can be indicated. This indicator can be used by the sending node of the transacting nodes to identify the sets the XML instance document is a member of. A receiving node of the transacting nodes can use the indicator to identify another component (e.g., part of message body (or body part)-specific layer) that can semantically and/or syntactically handle the received element of set of XML documents it is known to handle.

An XML schema may therefore be thought of as a definition of the structure, organization, and data types that are acceptable in corresponding XML documents. The XML schema further defines a set of XML elements, XML element attributes, and organization among the XML elements that is desired, whereby the XML schema serves as a vocabulary for the XML elements. Furthermore, since the schemas themselves are based on XML, they may also be extended and may exist in multiple versions. Because of extensibility (which allows any author to define their own application-specific elements, attributes, etc.), an XML schema document identified using the same identifier or media type may exist in multiple variations. To facilitate document compatibility between multiple nodes, common/certain meta-level structure or "schema" that is relevant to a particular document type is implemented at the transacting nodes. In some XML implementations, a Document Type Definition (DTD), XML Schema, NGRelax, or a Document Content Definition (DCD) or other XML schema, may be provided to define a set of rules with respect to the meta-structure of an XML file. Another implementation is to provide an XML-based alternative (i.e., an XML schema) to DTDs, for example, XML Schema, NGRelax, or other. The XML Schema language is also sometimes referred to as XML Schema Definition (XSD). A component that applies a XML schema uses it typically for validating an XML document. Accordingly, a "valid" document is a "well formed" document which also conforms to the rules of a XML schema(s) that is/are supported by the transacting nodes.

With respect to SIP messages in an IMS network environment, applicable standards (e.g., 3GPP TS 24.229 "IP multimedia call control protocol based on Session Initiation Protocol (SIP) and Session Description Protocol (SDP)"; Stage 3 (Release 8)) provide that the MIME type associated with an XML message body is "application/3gpp-ims+xml". The standards also provide that a SIP UA or proxy may insert or remove the XML message body or parts thereof as may be required in any SIP message. Accordingly, XML bodies or documents in SIP messages may exist according to XML schemas with different versions. Typically, the XML schema used (or a compatible version) to generate the body or body part is also needed by the recipient in order to validate the body or body part. Otherwise, as alluded to in the Background section of the present patent disclosure, an invalid XML document may lead to unpredictable behavior or erroneous results with respect to a requested telecommunications service. Furthermore, if a sender's XML message bodies are not accepted by a recipient's validator due to a lack of compatibility (forward or backward), significant interoperability issues can arise in the communications environment.

Figure 2:
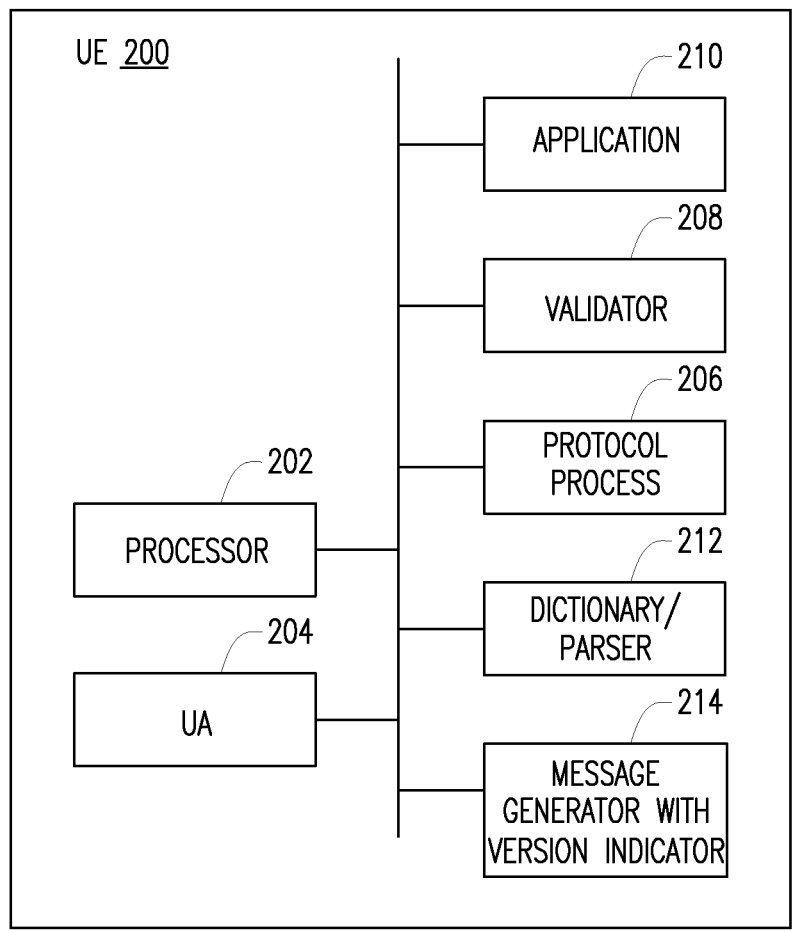
FIG. 2 depicts a block diagram of a User Equipment (UE) device according to an embodiment.

Referring now to FIG. 2, depicted therein is a block diagram of a UE device 200 according to an embodiment that is operable as a SIP entity capable of transacting XML message bodies. One or more processing entities 202 are provided for the overall control of various processes executable on the device. A User Agent 204 is operable either as a UAS or a UAC with respect to a communication protocol process such as a SIP process. Reference numeral 206 refers to an exemplary protocol process module. A validator 208 is operable to validate XML documents, for example, received in a SIP message body. Validator 208 may also be used to generate XML documents of a particular version and possibly include a document version in the document. An application 210 is operable to execute or invoke suitable software based on the contents of the XML message documents. A dictionary and parser 212 may also be provided with respect to message parsing. A message generator 214 operable in conjunction with applicable protocol processes is included that is also capable of providing an indicator such as, e.g., a schema version indicator, in communication protocol messages generated towards another SIP entity as set forth below.

Figure 3:
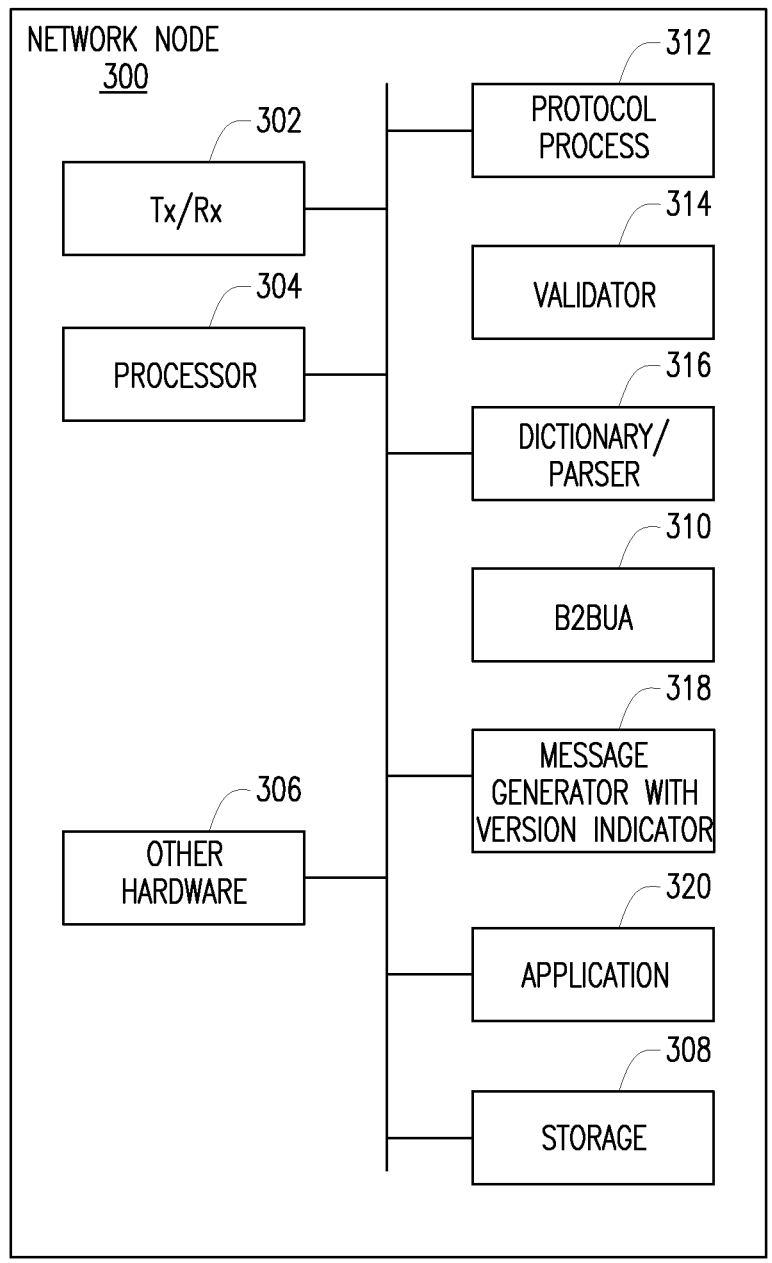
FIG. 3 depicts a block diagram of a network node according one embodiment.

FIG. 3 depicts a block diagram of a network node 300 according to an embodiment that is operable as a SIP entity capable of transacting XML message bodies. By way of illustration, the embodiment of network node 300 is exemplary of any IMS infrastructure entity referred to hereinabove. One or more processing entities 304 are provided for the overall control of various processes executed by the network node 306 regardless of its architecture or proxy functionality. A suitable transmit/receive (Tx/Rx) block 302 is operable to send or receive various communication protocol messages having XML documents in the message bodies. A Back-to-Back User Agent (B2BUA) 310 is operable as a UAS or UAC with respect to a communication protocol process 312 such as a SIP process. A validator 314 is operable to validate XML documents, for example, received in a SIP message body from a sender or is capable of generating XML documents of one or more versions and possibly include a document version in the document. An application 320 is operable to execute or invoke suitable software based on the contents of the XML message documents. A dictionary and parser 316 may also be provided with respect to message parsing. A message generator 318 operable in conjunction with applicable protocol processes is included that is also capable of providing an indicator (e.g., a schema version indicator) in communication protocol messages generated towards another SIP entity as set forth below. Additional hardware 306 and local storage 308 is provided to facilitate other functions relating to managing and negotiating schema/document version information in message flows, potentially in both upstream and downstream directions of a communication path.

Figure 4:
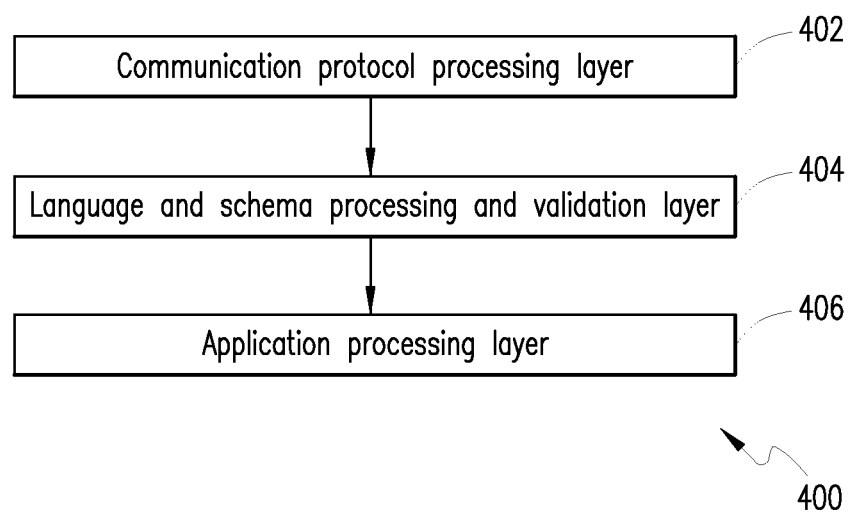
FIG. 4 depicts an embodiment of a software architecture employed at an entity for processing communication protocol messages in an exemplary distributed network environment, wherein the communication protocol messages may include message bodies or documents in multiple versions.

FIG. 4 depicts an embodiment of a software architecture 400 employed at an entity (e.g., UE device 200 or network node 300) for processing communication protocol messages in an exemplary distributed network environment wherein the communication protocol messages may include message documents in multiple versions. Upon receiving a communication protocol message from a sender, a suitable communication protocol layer 402 controls the processing of the received message. After it is determined that the received message is a proper message in accordance with the communication protocol architecture (e.g., validity of the command line, header fields, etc.), a message body (or body part)-specific layer 404 (e.g., based on the value of the Content-Disposition field, the default Content-Disposition for the Content-Type, the default Content-Disposition for the Content-Type when received on the particular entity) is executed. For example, if the message body (or body part)-specific layer is an XML layer considering well-formedness, validation can be executed. If there is an error at this stage, the processing may quit gracefully, with or without alerting, or may take alternative course(s) of action depending on any indications provided in the message itself or prior configuration. An application-specific layer 406 is executed thereafter.

Figure 5B:
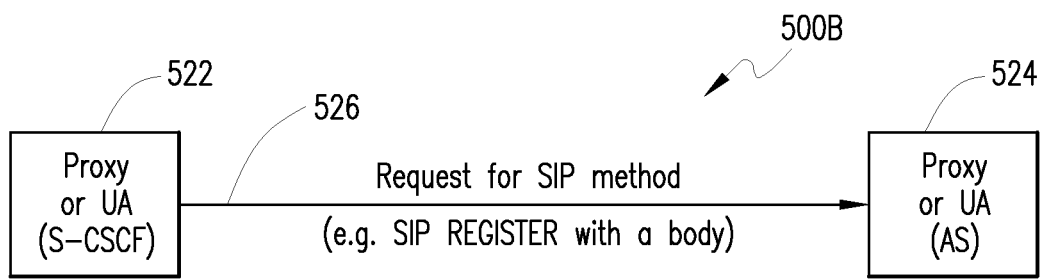
FIGS. 5B and 5C depict exemplary message flows between two entities in a distributed environment wherein communication protocol messages having message bodies are transmitted.
Figure 5C:
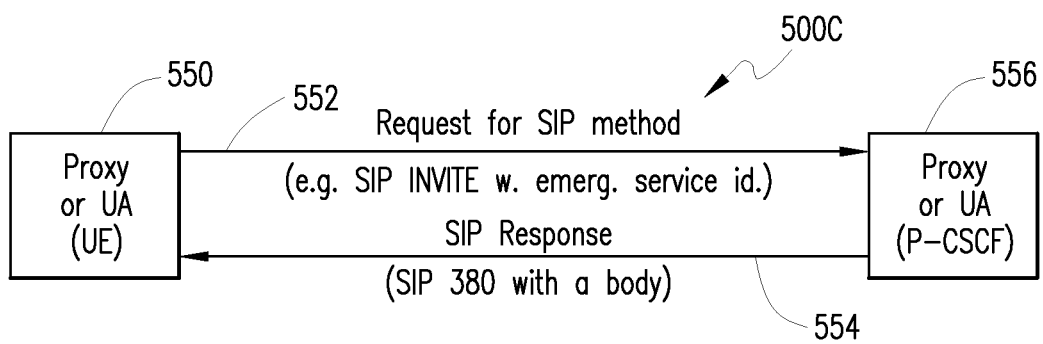

FIGS. 5B and 5C depict exemplary message flows between two entities in a distributed network environment wherein communication protocol messages having versioned message bodies (and/or according to versioned schemas) may be transmitted. In particular, reference numeral 500B in FIG. 5B refers to a message flow between two network nodes such as a Serving CSCF node 522 and an AS node 524 with respect to a particular service. A request for SIP method 526 exemplified by a SIP REGISTER message including a message body that may contain a versioned XML document in accordance with the MIME type "application/3gpp-ims+xml", where the MIME type (representing an XML document) can have a parameter conveying the XML schemas usable to validate the XML document. Reference numeral 500C in FIG. 5C refers to a message flow between an endpoint (e.g., a UE device) 550 and a network node such as a Proxy CSCF node 556. For purposes of the present patent disclosure, a "SIP message" may mean a request message or a response message depending on the context. Additionally, in certain variations, the expression "incoming message" may refer to a "request" or a "request message". Likewise, the expression "outgoing message" may refer to a "response" or a "response message". A SIP INVITE request message is exemplary of a request 552 that includes an Emergency Services identifier to indicate that the UE device 550 intends to initiate an emergency service call over the IMS network. A SIP response 554 from P-CSCF 556 may comprise a SIP 380 (Alternative Service) response including a message body. As can be appreciated by one skilled in the art, in both message flow scenarios, if the recipient of a message receives a message body document part of a set of message bodies or according to a schema that is incompatible with the set of message bodies supported by the recipient or cannot be validated by the recipient's validator (e.g., due to absence of the requisite schema), the service behavior will be compromised, leading to unexpected or erroneous results.

Figure 5D:
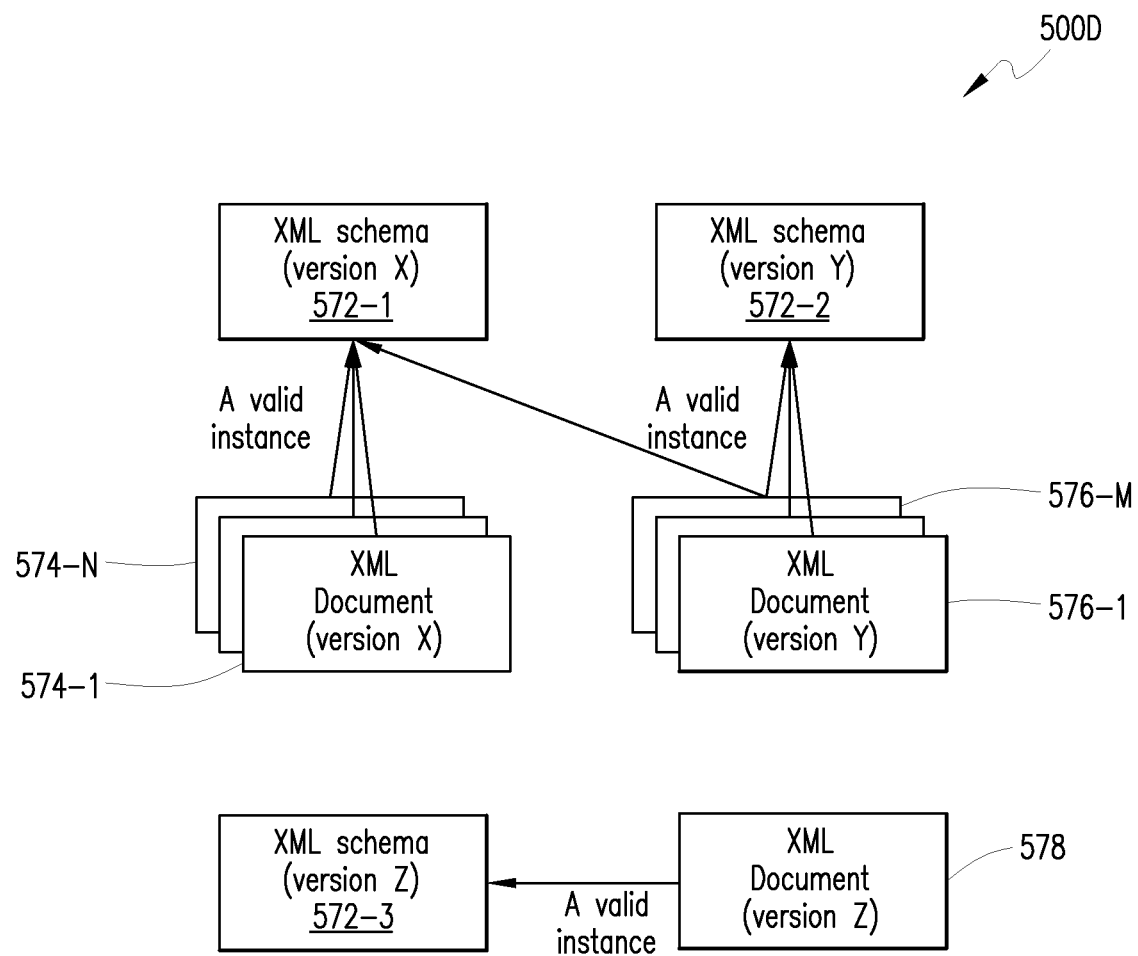
FIG. 5D depicts an exemplary set of different schemas for validating Extensible Markup Language (XML) documents provided as message bodies in communication protocol messages.

FIG. 5D depicts different schemas for validating documents. Reference numerals 572-1 through 572-3 exemplify three documents, where each document is a separate schema of the same type, e.g. MIME or content type: document 572-1 containing a schema of version X; document 572-2 containing a schema of version Y; and document 572-3 containing a schema of version Z. Instance documents, instances (e.g. XML documents) of the documents containing a schema (e.g. XML schema documents), may also indicate the version of the schema document according to the single MIME type that generated it: X, Y, or Z. Each instance document is part of a set with one or more instance documents generated by a single schema document of a particular version. Instance documents, instances (e.g. XML documents) of the documents containing a schema (e.g. XML schema documents), may also indicate the version of the schema document according to the single MIME type that generated it: X, Y, or Z. Each instance document is part of a set with one or more instance documents generated by a single schema document of a particular version. Instance documents including a version indicator "X", i.e., XML document instances 574-1 to 574-N, can minimally be properly validated by the schema document 572-1. Likewise, instances of documents in version Y, i.e., document instances 576-1 to 576-M, can be properly validated by the schema document 572-2. Document of version Z is exemplified as a single instance 578 that may be validated by the schema document 572-3. An instance document including a version indicator "Y" may also be accepted and validated by other schema documents as exemplified by the instance document 576-M and the schema document 572-1.

Figure 6A:
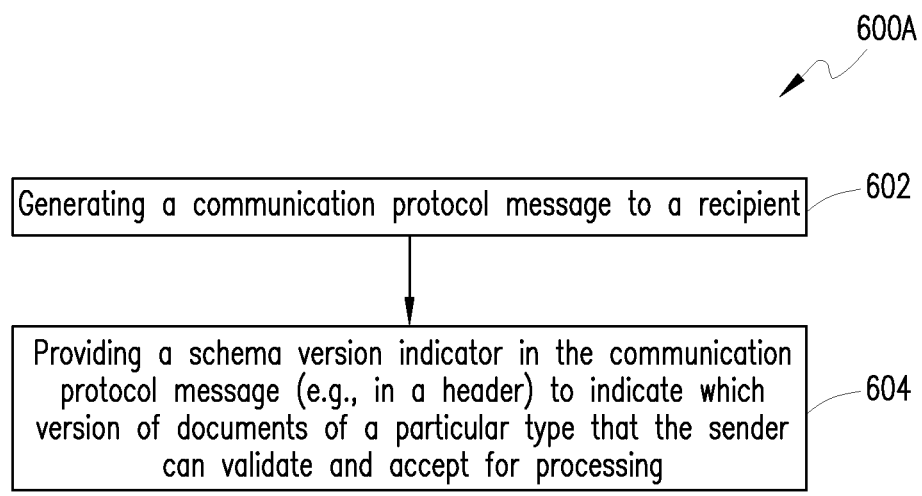
FIG. 6A depicts an embodiment of a method of negotiating schema and document version information relating to message bodies of a communication protocol.

FIG. 6A depicts an embodiment 600A of a method of negotiating schema version information relating to message bodies of a communication protocol. A sender generates a communication protocol message (e.g., a SIP request or a SIP response) towards a recipient (block 602). In one variation, the communication protocol message may include a suitable message body (or body part(s)). The communication protocol message further includes a schema version indicator (e.g., in the Accept header or header field) or otherwise includes sufficient information to indicate which: (i) set of message bodies/body parts of a particular content type, or (ii) documents of a particular content type, the sender can validate and accept for processing (block 604).

In one variation, absence of the schema version indicator may be interpreted by the recipient as indicating that the sender can validate and accept a default set of message body (part) contents or documents of a particular content type. Upon generating an initial INVITE request, a UE device is operable to indicate its support for the 3GPP IMS XML body in the Accept header field by including its MIME type as defined in subclause 7.6.1 of 3GPP TS 24.229. Optionally, a version parameter named 'sv' or 'schemaversion' can be added, indicating the versions of the XML Schema for the IM CN subsystem XML body supported. The syntax for the schemaversion parameter can be found elsewhere in the present document. If the 'sv' or 'schemaversion' parameter is absent, it shall be assumed that the UE supports version 1 of the XML Schema for the IM CN subsystem XML body. If support for the 3GPP IMS XML body in the Accept header field is not indicated, it shall be assumed that the UE supports version 1 of the XML Schema for the IM CN subsystem XML body.

Figure 6B:
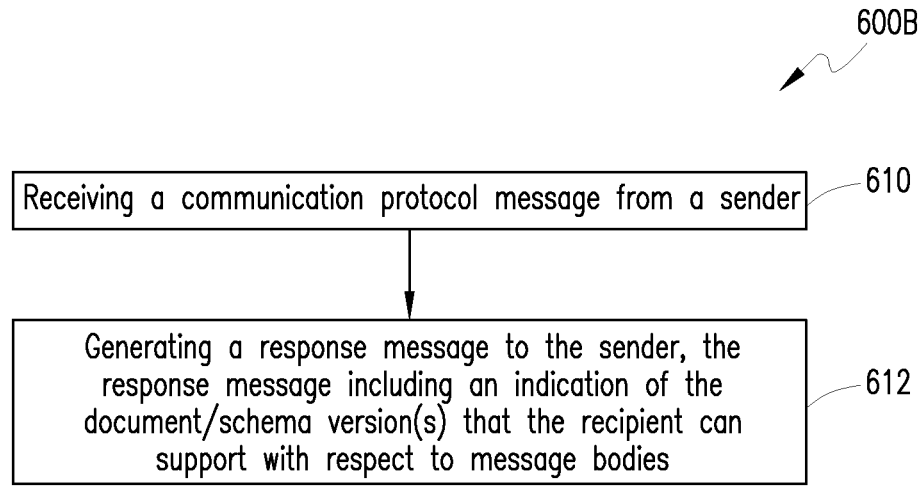
FIG. 6B depicts another embodiment of a method of negotiating schema and document version information relating to message bodies of a communication protocol.

FIG. 6B depicts another embodiment 600B of a method of negotiating schema version information relating to message bodies of a communication protocol. A recipient receives a communication protocol message (e.g., a SIP request or a SIP response message) from a sender (block 610). In one variation, the communication protocol message may include a suitable message body (or body part(s)). Responsive to the received communication protocol message, the recipient generates a response message towards the sender wherein the response message includes a document/schema version indicator, one or more message body (or body part(s)), a type associated with the body part, to indicate which: (i) sets of message body/body part contents of a particular type the body or part is a member of, or (ii) versions of XML schema documents of a particular type that can be used to validate the message body (or body part) (block 612). Furthermore, the indicator can be used by the sender to identify an application layer component that may be used for processing the information.

Figure 6C:
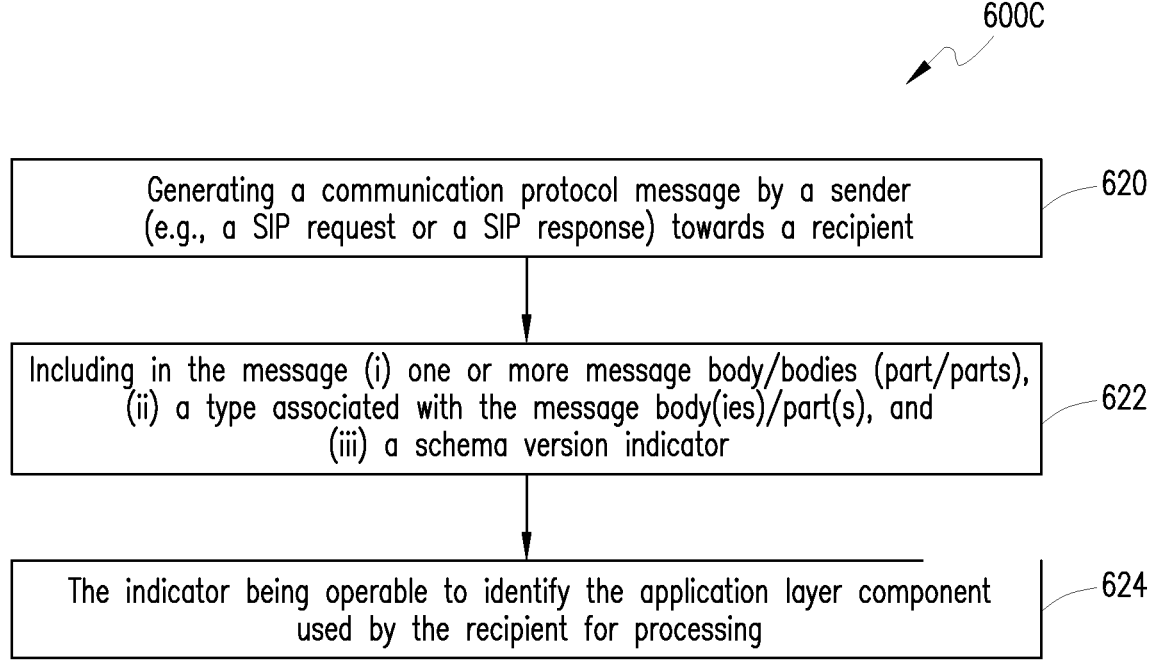
FIG. 6C depicts another embodiment of a method of negotiating schema and document version information relating to message bodies of a communication protocol.

Another embodiment 600C of a method of indicating schema version information relating to message body (or body part(s)) of a communication protocol message is set forth in FIG. 6C. A sender generates a communication protocol message (e.g., a SIP request or SIP response) towards a recipient (block 620). The communication protocol message further includes one or more message body (part(s)), a type associated with the message body, a schema version indicator (e.g. in the Content-Type header field), to indicate which: (i) sets of message body (part) contents of a particular type the boy (part) is a member of, or (ii) versions of XML schema documents of a particular type can be used to validate the message body (part) (block 622). Furthermore, the indicator can be used by the recipient to identify an application layer component that may be used for processing the information.

Figure 6D:
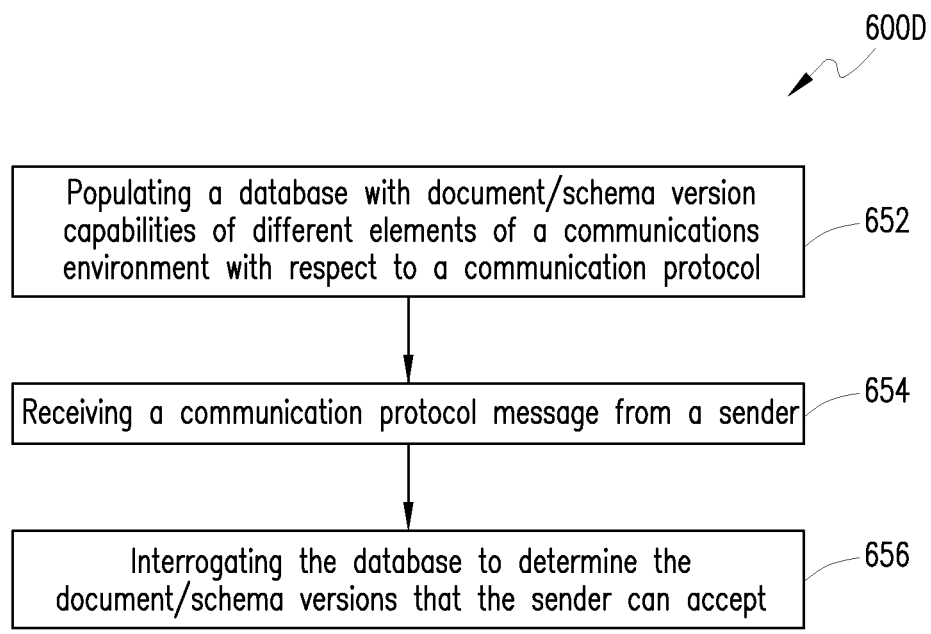
FIG. 6D depicts another embodiment of a method of negotiating schema and document version information relating to message bodies of a communication protocol.

Those skilled in the art will recognize that aspects of the embodiments set forth above can be mixed and implemented in one or more combinations. Furthermore, it should be realized that the negotiation methodologies set forth above are dynamically executed, in the sense that the negotiation process takes place between the entities while a service is being invoked. As another alternative, FIG. 6D depicts an embodiment 600D of a method of negotiating schema version information relating to message bodies of a communication protocol wherein a look-up scheme may be employed. A database is populated with document/schema version capabilities of different elements of a communications environment, potentially in an initial discovery process with respect to a communication protocol (block 652). The database may be distributed, mirrored, localized at the endpoints, or centrally located within a core portion of the communications environment. A recipient receives a communication protocol message (e.g., a SIP message) from a sender (block 654), which may include a suitable message body (or body part). Responsive to the received communication protocol message, the recipient interrogates the database to determine the document versions of a particular type that the sender can accept or validate (block 656). Additionally or alternatively, the recipient may be able to determine based on the interrogation as to the schema version that the sender uses. The sender's ability to convert documents of a particular version to another version that is compatible with one or more downstream nodes may also be interrogated. In a still further variation, a sender may interrogate the database prior to a transaction and determine the schema and/or document capabilities of a recipient. Accordingly, the sender may determine to include only the documents of compatible versions with respect to the recipient. As will be realized by one skilled in the art, the senders and recipients described herein and elsewhere in the patent disclosure may be User Agents operating as UASs or UACs, as appropriate, that are executed on endpoints, network nodes, or both.

Figure 7:
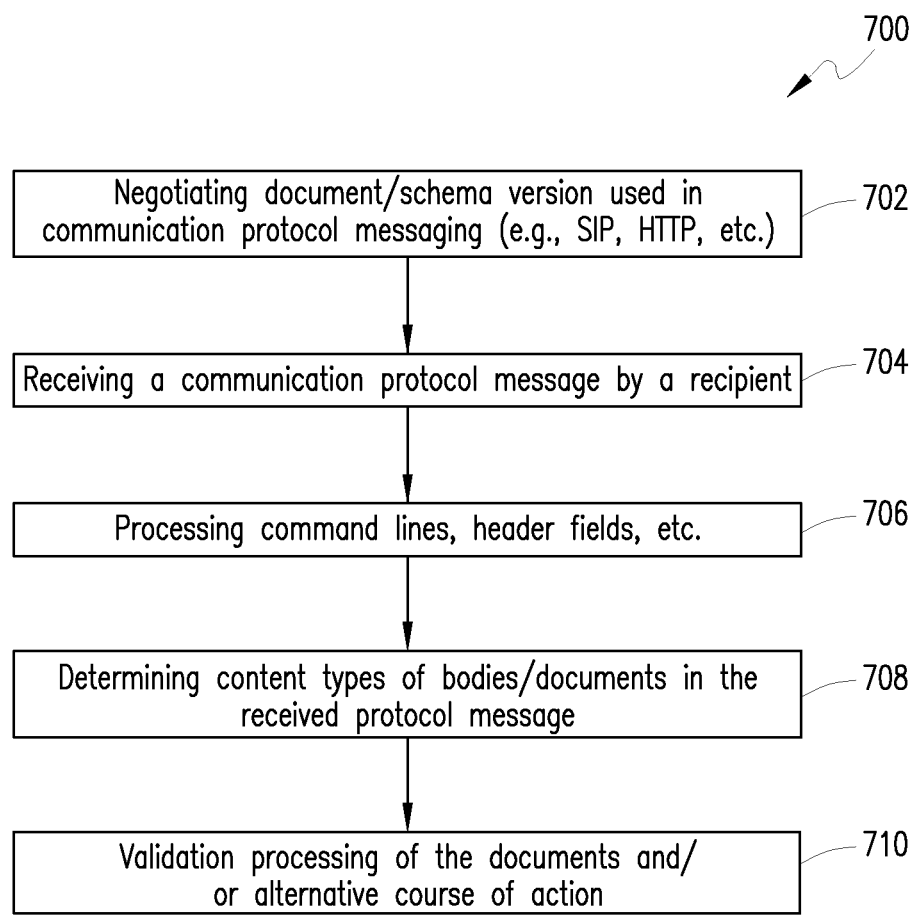
FIG. 7 depicts an embodiment of a method of message processing that involves validation of versioned message bodies (or body parts)

FIG. 7 depicts an embodiment 700 of a method of message processing that involves validation of versioned message bodies. Upon engaging in a negotiation methodology as set forth above with respect to a communication protocol messaging (block 702), a recipient receives a communication protocol message from a sender (block 704). A protocol processor (including, e.g., a message parser) may process the command lines and header fields (block 706), whereupon the content types (optionally including an indicator resolving to the one or more schema versions that can be used to validate the body (part) or document sets in which the body (part) is an element) of various documents received in the protocol message as body or bodies, are determined (block 708). Thereafter, the documents of each type may be validated by an appropriate schema processor/validator instantiated at the recipient or the recipient can otherwise determine whether the received document can be handled. Where an invalid document or a document that cannot be handled is received, a suitable alternative course of action (e.g., a graceful exit) may also be implemented instead of leading to undesirable results such as, e.g., freeze-up of the recipient node. These actions are consolidated as block 710.

Various implementational aspects with respect to the foregoing embodiments are set forth below in detail, especially in particular reference to the SIP-based messaging in 3GPP-compliant IMS network environments. As alluded to previously, applicable 3GPP standards provide for a MIME type, "application/3gpp-ims+xml", that may be associated with one or more set(s) of XML instance documents or corresponding XML schema. As the XML message bodies may be extended to include new elements and/or attributes, or may be changed such that elements and/or attributes are redefined, the various SIP UA entities interacting within an IMS environment may not be compatible with one another. In addition, the UA entities may wish to indicate their support for different 3GPP IMS XML bodies or documents. In one scenario, where an existing XML body is extended to include new elements/attributes, a recipient may still be able to process some of the XML, skipping perhaps over unknown elements and/or attributes (as an example of forward compatibility). The same treatment may also be applied where an existing XML body is changed such that the elements/attributes are redefined. In this scenario, the redefined elements and/or attributes may simply be ignored during validation. Alternatively or additionally, the recipient may be provided with the capability to signal back to the sender that the recipient does not understand the received XML document(s) (e.g., by means of a SIP 415 message (Unacceptable Content-Type) with the supported MIME types and optionally their schema version indicators listed in the SIP Accept header field). Those skilled in the art will recognize that several implementational choices exist with respect to how a SIP UA or proxy that receives such a response signal should treat it, whether the response signal should be stored, and if so, where and for how long, etc.

Forward compatibility among several versions may be achieved by placing certain code or instructions that have the effect of allowing additional elements, attributes, or both without causing the recipient's XML validator to declare the XML document instance invalid. In one embodiment, the following code portion may be inserted:

```
<xs:any namespace="##any"
processContents="lax"
minOccurs="0"
maxOccurs="unbounded"/>
```

However, not all XML processors or validators may support randomly placing the "xs:any" line mentioned above. To increase compatibility with XML validators, one exemplary embodiment provides that the "xs:any" line is placed as the last line of the definition of any complexType, group, etc. Accordingly, any new elements in updated XML schema are inserted just above the aforesaid code portion. Forward compatibility can also be achieved by placing "<xs:anyAttribute/>" or similar lines that have the effect of allowing additional attributes without causing the XML validator to declare the XML document instance invalid.

An exemplary construct that is consistent with respect to various applicable schema version compatibility issues is set forth below in Table 1.

TABLE 1

```
<xs:schema xmlns:xs="http://www.w3.org/2001/XMLSchema"
elementFormDefault="qualified"
attributeFormDefault="unqualified" version="1">
    <xs:complexType name="tIMS3GPP">
[..]
    <xs:element name="ims-3gpp" type="tIMS3GPP">
        <xs:attribute name="version"
type="allowedVersionValues" use="required"/>
    </xs:element>
    <xs:simpleType name='allowedVersionValues'>
        <xs:restriction base='xs:decimal'>
            <xs:pattern value='1|1\.[0-9]|1\.[1-9][0-9]'/>
        </xs:restriction>
    </xs:simpleType>
</xs:schema>
```

Another possible realization of an XML schema construct is set forth below in Tables 2A and 2B.

TABLE 2A

```
<?xml version="1.0" encoding="UTF-8"?>
<xs:schema   xmlns:xs="http://www.w3.org/2001/XMLSchema"
elementFormDefault="qualified"
attributeFormDefault="unqualified" version="1">
    <xs:complexType name="tIMS3GPP">
        <xs:sequence>
            <xs:choice>
                <xs:element   name="alternative-service"
type="tAlternativeService"/>
                <xs:element   name="service-info"
type="xs:string"/>
            </xs:choice>
            <xs:any   namespace="##any"
processContents="lax" minOccurs="0" maxOccurs="unbounded"/>
        </xs:sequence>
        <xs:attribute   name="version"
type="allowedVersionValues" use="required"/>
        <xs:anyAttribute/>
    </xs:complexType>
    <xs:simpleType name='allowedVersionValues'>
        <xs:restriction base='xs:decimal'>
            <xs:pattern   value='1|1\.[0-9]|1\.[1-9][0-9]'/>
        </xs:restriction>
```

TABLE 2B

```
    </xs:simpleType>
        </xs:choice>
    </xs:complexType>
    <xs:complexType name="tAlternativeService">
        <xs:sequence>
            <xs:element name="type" type="tType"/>
            <xs:element name="reason" type="xs:string"/>
            <xs:any   namespace="##any"
```

TABLE 2B-continued

```
processContents="lax" minOccurs="0" maxOccurs="unbounded"/>
        </xs:sequence>
        <xs:anyAttribute/>
    </xs:complexType>
    <xs:complexType name="tType">
        <xs:sequence>
            <xs:element   name="emergency"   minOccurs="0"
maxOccurs="1">
                <xs:complexType/>
            </xs:element>
            <xs:any   namespace="##any"
processContents="lax" minOccurs="0" maxOccurs="unbounded"/>
        </xs:sequence>
        <xs:anyAttribute/>
    </xs:complexType>
    <xs:element name="ims-3gpp" type="tIMS3GPP"/>
</xs:schema>
```

The root element of the 3GPP IMS XML schema as embodied in Tables 2A and 2B is described as follows:

<ims-3gpp>: This is the root element of the 3GPP IMS XML body. It shall always be present. The XML Schema version described in the present document is 1. XML instance documents of future versions of the XML Schema that is defined in Tables 2A and 2B, where the XML Schema version attribute part of the xs:schema element is less than 2 and more than or equal to 1, shall be valid against the XML Schema that is defined in Tables 2A and 2B in this document. XML instance documents of the XML Schema that is defined in Tables 2A and 2B in the present document shall have a version attribute value, part of the ims-3gpp element, that is equal to the value of the XML Schema version described in the present document.

In another representation, an XML schema's version attribute or parameter may be optional, wherein an appropriate default value may be assigned. In both cases, i.e., where the schema's version attribute is set to default and where the schema's version attribute is set to a predefined value that may be coded in a number of ways, the schemaValue in an XML instance document may be provided to match the version attribute of the XML schema from which the document instance is derived.

As alluded to previously, any UA is allowed to add and modify the XML documents. Accordingly, it is advantageous for the UA entities to know acceptable XML schemas and their versions. According to one embodiment, certain indications may be provided to indicate version numbers or a range of version numbers, descriptor technology (such as XML), and root element name. The MIME type may be extended, for example, to include such information: "application/3gpp-ims+xml;sv=1-1.99", where "sv" stands for schema version and the hyphen denotes a range in version values. In addition, a single value may be provided to indicate support for a single schema version and a comma-separated list may be provided to indicate specific schema versions as enumerated and separated by commas. Such a string may be placed in a suitable SIP message header, including but not limited to the Accept header field, Record-Route header field, etc. Other new header fields may also be defined (e.g., P-header) whereby each UA entity may insert its XML document handling capabilities and/or compatibilities. Additionally, where multiple UA entities may be involved in a signaling path, each entity could support different XML schemas. In such a multi-node scenario, a function element (fe) name may also be provided to identify the node (e.g., P-CSCF, S-CSCF, UE, AS, and so on) in multiple Accept headers as set forth in the following example:

"application/3gpp-ims+xml;sv=1-1.99;fe=ue,as,s-cscf".

A general syntax for signaling XML document handling capabilities in a multi-node scenario is as follows:
Functions=<fe name1 token>, <fe name2 token> . . . <fe nameN token>

Additional rules may also be provided depending on implementation. For instance, absence of an IMS functional element (ife) token may mean that the XML schema version and document instance information provided in the header is applicable to any downstream node. Likewise, absence of the sv parameter may mean that any schema version is applied or acceptable. Alternatively, absence of the sv parameter may mean that a default version, e.g., version "1", is applied or is acceptable. It should be apparent that token names other than "sv" or "ife" may also be used as long as all the nodes, e.g., originators or senders, recipients or terminators, and intermediary nodes, are aware of the nomenclature, functionality, syntax and the rules associated therewith. Set forth is an example of an sv token having discrete numbers as well as ranges to indicate supportability of various schema versions:

sv=1-2,10-12,14,16

The foregoing example indicates that schema versions 1 and 2 (inclusive), 10 through 12 (inclusive) are supported as well as versions 14 and 16. Since an XML body document may be included upstream also, it may be that a receiving UA (in a Back-to-Back User Agent or B2BUA configuration) or proxy wishes to use a non-provisional SIP message to indicate its support of certain XML schemas. Alternatively, in case of not supporting the required version number, the receiving UA may wish to indicate such information in a SIP error message. If the sender receives a non-provisional SIP response, it may follow up with a SIP request such as a CANCEL request, optionally including the reason for such an action.

A further example of an sv token in an Accept header is as follows:

Accept: application/3gpp-ims+xml;sv="1,1.1";ife="ue,p-cscf,s-cscf,as, . . . "

The foregoing example would enable different SIP UA entities involved, if needed, to populate the Accept header (e.g., in an INVITE message) with all their schema versions for the MIME type "application/3gpp-ims+xml". Set forth below are examples of Accept header formats in accordance with known standards (e.g., RFC 2616 and RFC 3261) that may be used for properly encoding the sv and ife tokens.

TABLE 3

| | |
|---|---|
| Accept | = "Accept" ":" #( media-range [ accept-params ] ) |
| media-range | = ( "*/*" \| ( type "/" "*" ) \| ( type "/" subtype ) ) *( ";" parameter ) |
| accept-params | = ";" "q" "=" qvalue *( accept-extension ) |
| accept-extension | = ";" token [ "=" ( token \| quoted-string ) ] |

TABLE 4

| | |
|---|---|
| Accept | = "Accept" HCOLON [ accept-range *(COMMA accept-range) ] |
| accept-range | = media-range *(SEMI accept-param) |
| media-range | = ( "*/*" / ( m-type SLASH "*" ) / ( m-type SLASH m-subtype ) ) *( SEMI m-parameter ) |
| accept-param | = ("q" EQUAL qvalue) / generic-param |
| qvalue | = ( "0" [ "." 0*3DIGIT ] ) / ( "1" [ "." 0*3("0") ] ) |

TABLE 4-continued

| | |
|---|---|
| generic-param | = token [ EQUAL gen-value ] |
| gen-value | = token / host / quoted-string |
| m-parameter | = m-attribute EQUAL m-value |
| m-attribute | = token |
| m-value | = token / quoted-string |

Yet another possible realization of an XML schema construct is set forth below in Table 5. The application/3gpp-ims+xml MIME type, used in the Accept header field according to subclause 5.1.3.1 of 3GPP TS 24.229, is extended to include specific version information needed for IM CN subsystem functional entities. If the parameter is absent, it shall be assumed that the UA originating the SIP method with the Accept header supports version 1 of the XML Schema for the IM CN subsystem XML body. The sv or schemaversion parameter has the syntax described in Table 5. The media-range component has been copied from IETF RFC 3261 for convenience. The sv or schemaversion parameter is an instance of m-parameter from the current media-range component of Accept header, where m-type is application and m-sub-type is 3gpp-ims+xml. If the sv or schemaversion parameter is set to 'none', the UA originating the SIP method indicates it does not find the "application/3gpp-ims+xml" MIME type acceptable. Table 5 shows a possible Syntax of the "sv" or "schemaversion" parameter for the "application/3gpp-ims+xml" MIME type:

TABLE 5

| | |
|---|---|
| media-range | = ( "*/*" / ( m-type SLASH "*" ) / ( m-type SLASH m-subtype ) ) *( SEMI m-parameter ) |
| schemaVersion | = ( "schemaversion" / "sv" ) "=" "none" / [schemaversions *(COMMA schemaversions)] |
| schemaversions | = token / ( DIGIT [ "." 0*2DIGIT ] [ "-" ( DIGIT [ "." 0*2DIGIT ] ) ] ) |

As set forth in the foregoing examples, the sv token or parameter can be provided with discrete numerical values that are comma-separated as well as ranges of numbers or digits that have the advantage of being sequential in specifying a schema version. In addition, the sv token may take on values provided as, but not limited to, textual strings, characters, alphanumerical sequences, and the like. Additional information may also be provided in the SIP message header fields to indicate further directives that can be executed at the level of a communication protocol processing layer. By way of illustration, a receiving UA may conclude upon inspecting the Accept header which UA roles or even UAs or functional elements support what types of content. In one implementation, any receiving UA inserting XML content type document instance(s) may be able to insert a directive to direct a downstream element to process one or more XML content type documents. Additional directives may include, but not limited to, the following: "remove after processing", "pass along if don't understand", "must understand" or "ok to remove", and the like. Directives may be coded as textual strings or binary values, as exemplified below:

| | |
|---|---|
| Remove after processing | 00 |
| Pass along if done understand | 01 |
| Must understand | 10 |
| Ok to remove | 11 |

It must be recognized that the above is just one illustrative example and the ordering of the directives could be any and could be coded as any number of bits.

One suitable information element to include such information may be a URI or MIME parameter, preferably in a textual string representation. In another alternative, such directives may also be encoded within the message body or within a message body part. In another alternative, the information may be represented as an additional body part if multiple body parts are supported, e.g., encoded in some body part with directives referencing other body parts. For instance, the representations may be encoded in XML and for each XML schema that exists per receiving node. In a still further alternative embodiment, the directives per receiving node may be placed per body (or body part) in the Content-Type header field used in the returned SIP messages for identifying the contents. Following is a high-level structure for such a representation:

```
<<Begin SIP message and header fields
    - Including Content-Type header field + optional
      parameters including zero or more of directives,
      schemaversions, or other parameters
    - if multi-part/*    MIME bodies are supported and
      multiple  body  parts  are  included,  parameters
      including  zero  or   more  of  directives,
      schemaversions, or other parameters
End SIP message>>
```

Another alternative encoding for sv values may also be provided using name spaces. By way of illustration, XML schema versioning in a PoC service is set forth in the following example to demonstrate the use of name spaces for signaling the sv information.

```
Accept:application/poc-settings+xml;
    sv="urn:oma:params:xml:ns:poc:poc-settings,
    urn:oma:xml:poc:poc2.0-settings"
```

Basically, the token named "sv" in the above example may be replaced with a token named "ns" to indicate that a list of one or more XML namespace identifiers follows with quotes and separated by commas. Further, a similar approach may also be used for other service-specific UA entities, e.g., UAs with respect to Voice Call Continuity (VCC), IMS Centralized Services (ICS), IMS Session Continuity (ISC), etc.

In addition to conveying SIP level message directives, various attributes may also be transmitted that define a handling capability with respect to the XML documents on a per node basis. That is, the attribute information may be used to indicate allowable behavior for each identified SIP UA or proxy element by way of a policy management mechanism that is executed in association with an XML validator. The following policies are illustrative: (i) ok to ignore, continue with processing message document, drop element; (ii) mandatory to understand, reject message document if don't understand; (iii) mandatory to pass on, no processing is required if not understood; and so on. The behavior policies may be extended to indicate node-specific behavior at each receiving node, e.g., (i) UE requirements; (ii) P-CSCF requirements; (iii) S-CSCF requirements; (iv) Service requirements (e.g., ICS Identifier or ICSI information), and so on.

As set forth above in reference to the embodiment shown in FIG. 6C, an alternative mechanism to signal the schema version and document set version information may involve accessing a database configured with the version support capabilities on per node basis. The database may be accessible to any node in the IMS network. Furthermore, the location of the database may be provided to the nodes via any suitable mechanism (e.g., a mechanism based on RFC 4483). A Uniform Resource Locator (URL) identifying the location of the database may be provided in a message that node can use to access the database. Also, the database could be in a single node or spread across multiple nodes in a distributed database architecture.

An exemplary syntax structure of the sv or schemaversion parameter is provided below in Table 6:

TABLE 6

| m-parameter | /= ("sv" / "schemaversion") EQUAL LDQUOT [ sv-value-list ] RDQUOT |
|---|---|
| sv-value-list | = sv-value-range *( "," sv-value ) |
| sv-value-range | = sv-value [ "-" sv-value ] |
| sv-value | = number / token |
| number | = 1*DIGIT [ "." 1*DIGIT ] |

The sv syntax shown above (in Backus-Naur Format or BNF form) may be used to convey various types of values (digits, strings, etc.) in order to indicate: (i) the versions of the 3GPP IMS XML schema that can be used to validate the 3GPP IMS XML bodies, if the MIME type and parameter are present in the Content-Type header, and (ii) the accepted versions of the 3GPP IMS XML bodies, if the MIME type and parameter are present in the Accept header. As alluded to before, default rules may apply where the sv or schemaversion parameter or when the sv or schemaversion parameter is absent. In one embodiment, if the sv or schemaversion parameter is absent it is to be understood that a certain version or set of versions is supported, e.g. version 1. In another embodiment, if MIME type (e.g. "application/3gpp-ims+xml") is absent and the corresponding sv or schemaversion parameter are absent, it is to be understood that a certain version or set of versions of the MIME type (e.g. "application/3gpp-ims+xml") are acceptable anyway, e.g. version 1. In yet another embodiment, if the sv or schemaversion parameter value is absent it is to be understood that no version or set of versions of the MIME type is supported. The latter feature may be advantageous in cases where even if the corresponding MIME type (e.g. "application/3gpp-ims+xml") is absent, the recipient is to understand that the MIME type and a default value for the version parameter are acceptable regardless. In this case, a sender can use a SIP header field (e.g. the Accept header field) to indicate explicitly that a MIME type and any of its versions are not acceptable.

As one skilled in the art will recognize, the MIME type and its parameters may need to be registered with a suitable registration authority (i.e., a registrar) such as, e.g., the Internet Assigned Numbers Authority or IANA. Set forth below is an exemplary template that can be used for registration purposes:

| MIME media type name: | application |
|---|---|
| MIME subtype name: | 3gpp-ims + xml |
| Required parameters: | none |
| Optional parameters: | "sv" or "schemaversion" |

The foregoing registration entry may include sv syntax shown above in Table 5 in the Augmented BNF (ABNF) form.

Figure 8:
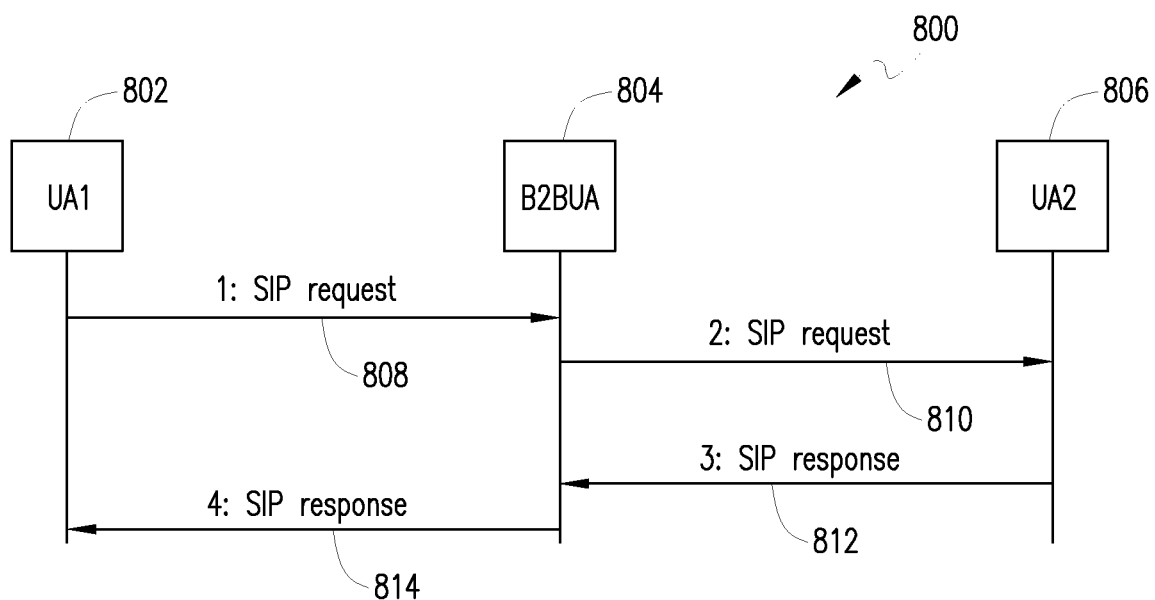
FIG. 8 depicts an exemplary message flow diagram involving multiple entities where an intermediary node is operable to negotiate schema information with respect to upstream and downstream entities according to an embodiment of the present disclosure.

Referring now to FIG. 8, shown therein is an exemplary message flow diagram 800 involving multiple SIP entities wherein an intermediary node is operable to negotiate schema and document version information with respect to upstream and downstream entities according to an embodiment of the present disclosure. UA1 802 is an originator or sender of a request ultimately directed to UA2 806 operating as a recipient. A B2BUA 804 (e.g., a border gateway node such a BGCF or IBCF) is operable as an intermediary node. UA1 802 generates a SIP INVITE request 808 with its Accept header set to:

application/3gpp-ims+xml;sv="1,1.1";ife="ua1"

The intermediary node 804 intercepts the INVITE 808 and modifies the Accept header and generates a new INVITE request 810 towards UA2 806. The modified Accept header now includes the following:

application/3gpp-ims+xml;sv="1,1.1,2.5";ife="ua1",
application/3gpp-ims+xml;sv="2.5";ife=b2bua"

In essence, by modifying the Accept header information as set forth above, the intermediary node 804 conveys that it is operable to convert or otherwise convey the application/3gpp-ims+xml content compliant with schema version 2.5 that is destined to UA1 (on upstream path) into the XML content that is compatible with schema version 1 or 1.1 supported by UA1 802 (insofar as possible; on the other hand, where it is not possible, the unconvertible information may be signaled otherwise). In addition, the intermediary node 804 also signals that it is operable to accept the application/3gpp-ims+xml content according to schema version 2.5 that is destined to the B2BUA. Suitable response messages are 812 and 814 are propagated back on the return path, which messages may or may not include any documents such as those with content-type "application/3gpp-ims+xml" as SIP body or body part(s).

It should be realized that where some of the current versions of the 3GPP standard (i.e., Release 5, Release 6, Release 7 and Release 8 of 3GPP TS 24.229) do not make a provision for UAs to include the "application/3gpp-ims+xml" MIME type explicitly in the Accept header, additional variations may need to be implemented. In order to prevent modification of the deployed Release 5/6/7/8-compliant UAs and require the insertion of "*/*" or "application/*" or "application/3gpp-ims+xml", additional embodiments of the present disclosure provide that a special version indicator (e.g., absence of a version in the schemaversion or sv parameter's value: application/3gpp-ims+xml;sv=" ") or token (e.g., "none") can be reserved to indicate that the content of the aforesaid MIME type is not acceptable by the UA originating the SIP method. The special version token may also be used to signify that absence of "*/*", "application/*" or "application/3gpp-ims+xml", or absence of the "sv" or "schemaversion" parameter while the "application/3gpp-ims+xml" MIME type is present, indicates supportability and application of a default version (e.g., schema version 1 relating to the aforesaid MIME type).

Figure 9:
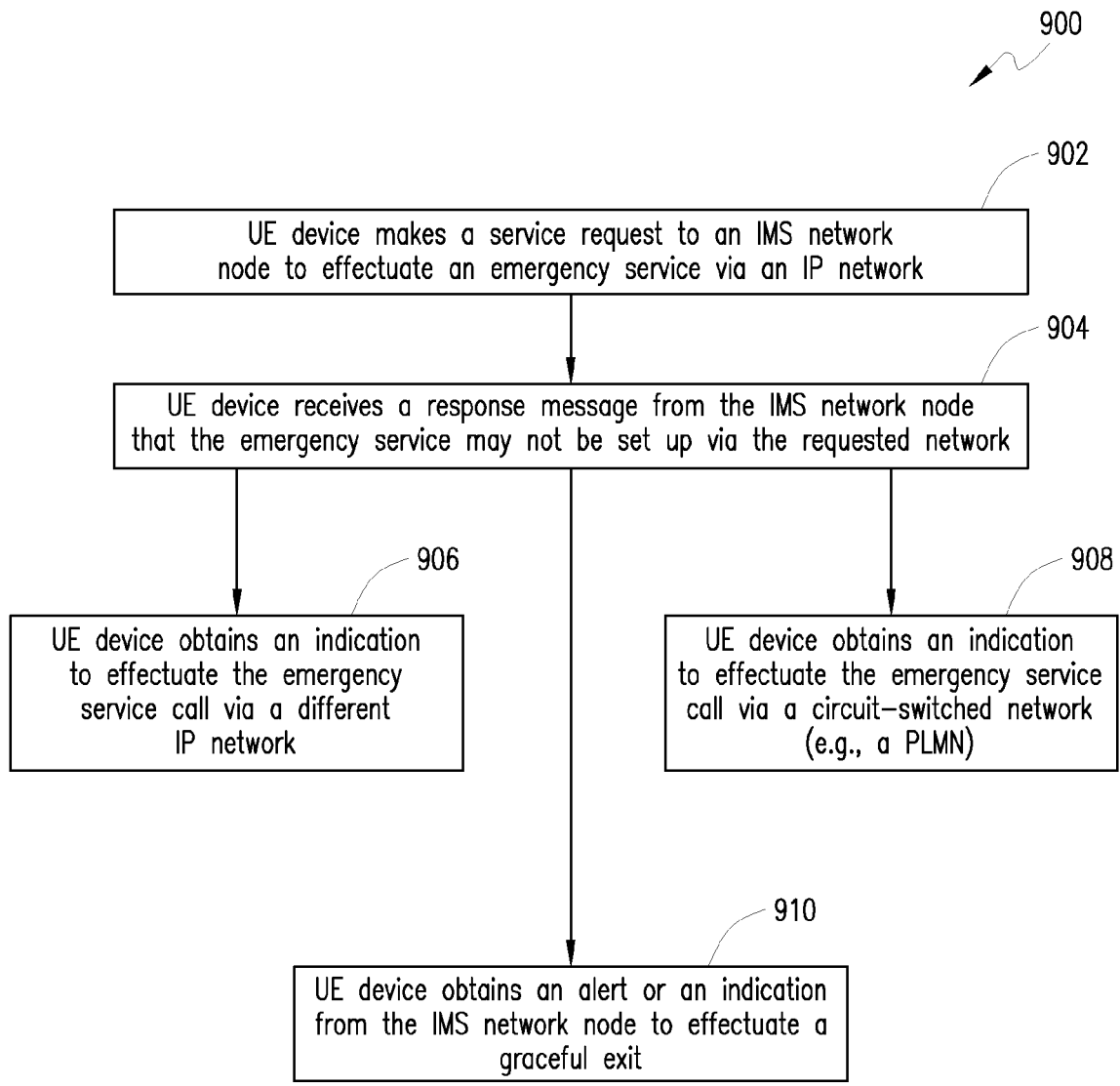
FIG. 9 depicts an exemplary implementation of a telecommunications service (Emergency Services) according to an embodiment of the present disclosure.

FIG. 9 depicts an exemplary implementation of a telecommunications service such as, e.g., an Emergency Services (ES) call, over an IMS network with SIP messaging. As can be appreciated by one skilled in the art, when a UE device wants to make an ES call over the IMS network, the P-CSCF node (typically the first IMS node that the UE device interacts with) may not allow the ES call for a number of reasons. For example, making an ES call over an IP network may be prohibited by the regulatory authorities in a region or country where only ES calls over a conventional CS network are mandated. In some instances, IP-based ES calls can be very expensive and, in addition, there may not be carrier-grade reliability with respect to such calls. In still further scenarios, even where an IP-based ES call is allowed, the IMS network may want to route the call over a different IP network rather than handling it itself. Regardless of the reasons, when different versions of XML message bodies and/or XML schemas are used by the various entities, i.e., the UE device, P-CSCF, etc., with respect to setting up the ES call, there is a possibility that such message bodies or schemas are not compatible, thereby resulting in unpredictable behavior. Not only may the intended ES call not be completed, the requesting UE device may not receive any alert or indication as to any possible alternative course(s) of action.

In the exemplary scheme 900 shown in FIG. 9, the SIP entities are provided with the capability of negotiating version information and of signaling alternative courses of action where needed. Accordingly, when the UE device makes a service request to an IMS node (i.e., the P-CSCF node) to effectuate an ES call via the IP network (block 902), the IMS node is adapted to process the incoming request and execute appropriate service logic to generate a response message that the ES call via the requested network may not be established (block 904). The IMS node is also adapted to provide an indication to the UE device (e.g., via the response message) to effectuate the ES call over an alternative network (e.g., a different IP network) and may include applicable routing information (block 906). In another alternative, the IMS node may be adapted to provide an indication to the UE device that the ES call is to be effectuated over a conventional CS network, which may again include appropriate routing information (block 908). Alternatively or additionally, the IMS node may also provide an alert and/or indication to the UE device that the requested ES call cannot be completed, whereby a graceful exit may be facilitated, including, e.g., a cause code or textual reason encoded as part of the response message as to whether or why an alternative service is suggested by the network (block 910). Further, responsive to the indications included in the response message or due to a local default procedure, the UE device may also interrogate a database (again, either locally provisioned within the UE device or remotely provisioned in the network environment) to obtain appropriate ID and/or routing information with respect to setting up the ES call over the alternative network.

Based on the foregoing, it can be seen that the present embodiments provide a method of responding to a request in a network environment including an IMS portion. As alluded to before, a recipient is operable to receive a request message from a sender, wherein the request message may be substantially free of an indication of acceptance by the sender of a body of a particular content type. The recipient includes functionality for providing a response message including at least one body of the particular content type. In one embodiment, the request message can be a request for an Emergency Services (ES) call session and the particular content type is application/3gpp-ims+xml. As specified in detail above, the request message may include an Accept header field or may be devoid of an Accept header field.

Figure 10:
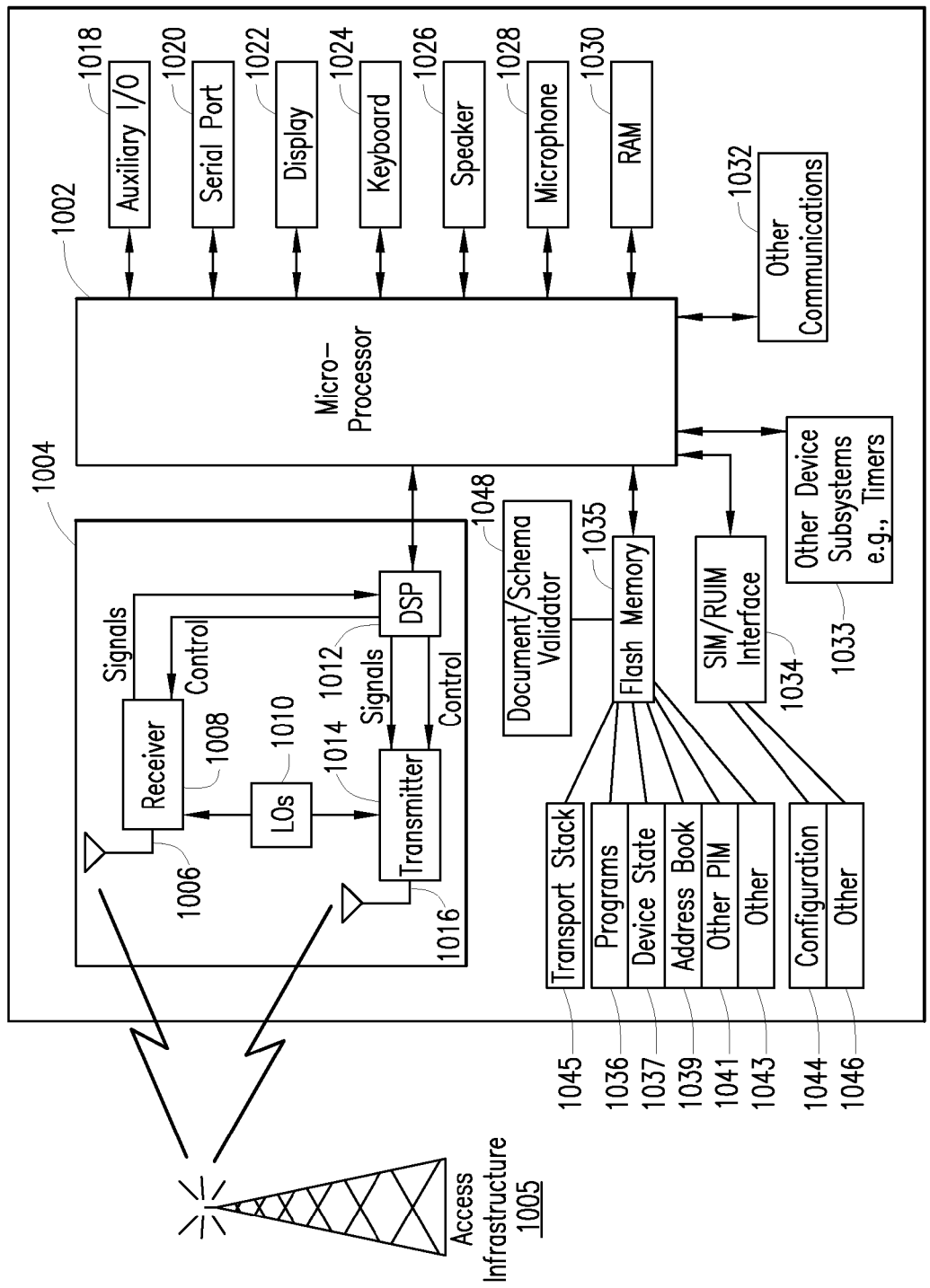
FIG. 10 is a block diagram that depicts additional details of an embodiment of a communications device operable for purposes of the present patent disclosure.

FIG. 10 depicts a block diagram of an embodiment of a communications device operable as an SIP-compatible UE device, e.g., UE 102, for purposes of the present patent disclosure. It will be recognized by those skilled in the art upon reference hereto that although an embodiment of UE 102 may comprise an arrangement similar to one shown in FIG. 10, there can be a number of variations and modifications, in hardware, software or firmware, with respect to the various modules depicted. Accordingly, the arrangement of FIG. 10 should be taken as illustrative rather than limiting with respect to the embodiments of the present patent disclosure. A microprocessor 1002 providing for the overall control of an embodiment of the UE device is operably coupled to a communication subsystem 1004 that may be capable of multimode communications (e.g., CS domain, IP domain such as IMS, et cetera). The communication subsystem 1304 generally includes one or more receivers 1008 and one or more transmitters 1014 as well as associated components such as one or more local oscillator (LO) modules 1010 and a processing module such as a digital signal processor (DSP) 1012. As will be apparent to those skilled in the field of communications, the particular design of the communication module 1004 may be dependent upon the communications networks with which the mobile device is intended to operate (e.g., a CDMA network, a GSM network, WLAN, et cetera). Regardless of the particular design, however, signals received by antenna 1006 through appropriate access infrastructure 1005 (e.g., cellular base station towers, WLAN hot spots, etc.) are provided to receiver 1308, which may perform such common receiver functions as signal amplification, frequency down conversion, filtering, channel selection, analog-to-digital (A/D) conversion, and the like. Similarly, signals to be transmitted are processed, including modulation and encoding, for example, by DSP 1012, and provided to transmitter 1014 for digital-to-analog (D/A) conversion, frequency up conversion, filtering, amplification and transmission over the air-radio interface via antenna 1016.

Microprocessor 1002 may also interface with further device subsystems such as auxiliary input/output (I/O) 1018, serial port 1020, display 1022, keyboard/keypad 1024, speaker 1026, microphone 1028, random access memory (RAM) 1030, a short-range communications subsystem 1032, and any other device subsystems, e.g., timer mechanisms, generally labeled as reference numeral 1033. To control access, an interface 1034 may also be provided in communication with the microprocessor 1002 with respect to a removable storage module (Universal/Subscriber Identity Module (U/SIM) or Removable User Identity Module (RUIM)). In one implementation, U/SIM or RUIM interface 1034 may be operable with a U/SIM or RUIM card having a number of key configurations 1044 and other information 1046 such as default content disposition profiles, policy managers, alternative network information, as well as identification and subscriber-related data that may supplement local storage-based information.

Operating system software and applicable service logic software may be embodied in a persistent storage module (i.e., non-volatile storage) such as Flash memory 1035. In one implementation, Flash memory 1035 may be segregated into different areas, e.g., storage area for computer programs 1036 (e.g., service processing logic), as well as data storage regions such as device state 1037, address book 1039, other personal information manager (PIM) data 1041, and other data storage areas generally labeled as reference numeral 1043. A transport stack 1045 may be provided to effectuate one or more appropriate radio-packet transport protocols. In addition, an XML schema validator and/or version negotiation/indication logic module 1048 is provided for facilitating one or more embodiments as set forth in detail hereinabove.

It should be appreciated that the various operations, components and processes set forth in the present patent disclosure, operable either at the UE device, the IMS network node, or at other network locations, may be accomplished via a number of means, including software (e.g., program code or sequence of instructions), firmware, hardware, or in any combination, usually in association with a processing system, as components configured to perform specific functions. Where the processes are embodied in software, such software may comprise program instructions that form a computer program product, instructions on computer-accessible media, uploadable service application software, or software downloadable from a remote station, and the like. Further, where the processes, data structures, or both, are stored in computer-accessible storage, such storage may include semiconductor memory, internal and external computer storage media and encompasses, but not limited to, nonvolatile media, volatile media, and transmission media. Nonvolatile media may include CD-ROMs, magnetic tapes, PROMs, Flash memory, or optical media. Volatile media may include dynamic memory, caches, RAMs, etc. Transmission media may include carrier waves or other signal-bearing media. As used herein, the phrase "computer-accessible medium" encompasses "computer-readable medium" as well as "computer-executable medium."

Furthermore, although the embodiments set forth herein have been described in detail with respect to SIP-based messaging in 3GPP-compliant networks, it will be recognized that the teachings of the present patent disclosure may be applied to other distributed environments involving different protocols (e.g., HTTP). Likewise, the teachings herein may also be applied in respect of other Markup languages where versioned bodies are possible and some sort of a meta-structure is used for validation of such bodies.

It is believed that the operation and construction of the embodiments of the present patent application will be apparent from the Detailed Description set forth above. While the exemplary embodiments shown and described may have been characterized as being preferred, it should be readily understood that various changes and modifications could be made therein without departing from the scope of the present disclosure as set forth in the following claims.

What is claimed is:

1. A method of responding to a request in a network environment, said method comprising:
   receiving at a recipient a Session Initiation Protocol (SIP) request message from a sender, said SIP request message being free of an indication of acceptance by said sender of a body of a particular content type; and
   providing a SIP response message including at least one body of said particular content type to said sender, wherein an acceptance of said at least one body of said particular content type was not indicated by said sender in said SIP request message.

2. The method of responding to a request as recited in claim 1, wherein said SIP request message is a request for an Emergency Services (ES) call session.

3. The method of responding to a request as recited in claim 1, wherein said particular content type is application/3gpp-ims+xml.

4. The method of responding to a request as recited in claim 1, wherein said SIP request message includes an Accept header field.

5. The method of responding to a request as recited in claim 1, wherein said SIP request message is devoid of an Accept header field.

6. The method of responding to a request as recited in claim 1, wherein said sender is a User Equipment (UE) device disposed in said network environment.

7. The method of responding to a request as recited in claim 1, wherein said sender is a network node disposed in said network environment.

8. The method of responding to a request as recited in claim 1, wherein said recipient is a network node disposed in said network environment.

9. The method of responding to a request as recited in claim 1, wherein said recipient is a UE device disposed in said network environment.

10. The method of responding to a request as recited in claim 1, wherein at least one of said SIP request message and said SIP response message contain a body comprising at least one XML document.

11. The method of responding to a request as recited in claim 1, wherein said SIP response message is a SIP 380 (Alternative Service) message.

12. The method of responding to a request as recited in claim 1, wherein said SIP request message is a SIP INVITE message.

13. An apparatus for facilitating responding to a request in a network environment, said apparatus comprising:
   a component associated with a recipient configured to receive a Session Initiation Protocol (SIP) request message from a sender, said SIP request message being free of an indication of acceptance by said sender of a body of a particular content type; and
   a component associated with said recipient configured to provide a SIP response message including at least one body of said particular content type to said sender, wherein an acceptance of said at least one body of said particular content type was not indicated by said sender in said SIP request message.

14. The apparatus for facilitating responding to a request as recited in claim 13, wherein said SIP request message is a request for an Emergency Services (ES) call session.

15. The apparatus for facilitating responding to a request as recited in claim 13, wherein said particular content type is application/3gpp-ims+xml.

16. The apparatus for facilitating responding to a request as recited in claim 13, wherein said SIP request message includes an Accept header field.

17. The apparatus for facilitating responding to a request as recited in claim 13, wherein said SIP request message is devoid of an Accept header field.

18. The apparatus for facilitating responding to a request as recited in claim 13, wherein said sender is a User Equipment (UE) device disposed in said network environment.

19. The apparatus for facilitating responding to a request as recited in claim 13, wherein said sender is a network node disposed in said network environment.

20. The apparatus for facilitating responding to a request as recited in claim 13, wherein said recipient is a network node disposed in said network environment.

21. The apparatus for facilitating responding to a request as recited in claim 13, wherein said recipient is a UE device disposed in said network environment.

22. The apparatus for facilitating responding to a request as recited in claim 13, wherein at least one of said SIP request message and said SIP response message contain a body comprising at least one XML document.

23. The apparatus for facilitating responding to a request as recited in claim 13, wherein said SIP response message is a SIP 380 (Alternative Service) message.

24. The apparatus for facilitating responding to a request as recited in claim 13, wherein said SIP request message is a SIP INVITE message.

* * * * *

UNITED STATES PATENT AND TRADEMARK OFFICE
CERTIFICATE OF CORRECTION

PATENT NO. : 8,463,913 B2
APPLICATION NO. : 12/240381
DATED : June 11, 2013
INVENTOR(S) : Jan John-Luc Bakker et al.

It is certified that error appears in the above-identified patent and that said Letters Patent is hereby corrected as shown below:

In the Specifications:

Column 2, Line 2, "according one embodiment" should read -- according to one embodiment --.

Column 3, Line 11, "patent disclosure, an apparatus" should read -- patent disclosure, disclosed herein is an apparatus --.

Column 6, Line 10, "call/session that currently in progress" should read -- call/session that is currently in progress --.

Column 11, Line 23, "boy (part) is a member of" should read -- body (part) is a member of --.

Column 16, Line 63, "Pass along if done understand" should read -- Pass along if don't understand --.

Signed and Sealed this
Twenty-third Day of July, 2013

Teresa Stanek Rea
*Acting Director of the United States Patent and Trademark Office*